(12) United States Patent
Furusato et al.

(10) Patent No.: US 9,434,883 B2
(45) Date of Patent: *Sep. 6, 2016

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Yoshimasa Furusato, Chiba (JP); Masayuki Saito, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/806,657

(22) Filed: Jul. 23, 2015

(65) Prior Publication Data

US 2016/0032188 A1    Feb. 4, 2016

(30) Foreign Application Priority Data

Jul. 29, 2014  (JP) ................. 2014-153674
Jan. 21, 2015  (JP) ................. 2015-009403

(51) Int. Cl.
| | |
|---|---|
| G02F 1/1333 | (2006.01) |
| C09K 19/54 | (2006.01) |
| C09K 19/34 | (2006.01) |
| C09K 19/02 | (2006.01) |
| C09K 19/20 | (2006.01) |
| C09K 19/30 | (2006.01) |
| C09K 19/04 | (2006.01) |
| C09K 19/12 | (2006.01) |

(52) U.S. Cl.
CPC ........... *C09K 19/54* (2013.01); *C09K 19/0208* (2013.01); *C09K 19/20* (2013.01); *C09K 19/3066* (2013.01); *C09K 19/3402* (2013.01); *C09K 2019/0466* (2013.01); *C09K 2019/123* (2013.01); *C09K 2019/301* (2013.01); *C09K 2019/3021* (2013.01); *C09K 2019/3025* (2013.01); *C09K 2019/3071* (2013.01); *C09K 2019/3077* (2013.01); *C09K 2019/3078* (2013.01); *C09K 2019/3083* (2013.01); *C09K 2019/3422* (2013.01)

(58) Field of Classification Search
CPC .............. C09K 19/54; C09K 19/3402; C09K 19/0208; C09K 19/20; C09K 19/3066; C09K 2019/3422; C09K 2019/0466; C09K 2019/123; C09K 2019/301; C09K 2019/3021; C09K 2019/3025; C09K 2019/3071; C09K 2019/3077; C09K 2019/3078; C09K 2019/3083
USPC ........................................ 252/299.6; 428/1.1
See application file for complete search history.

(56) References Cited

U.S. PATENT DOCUMENTS

| | | | |
|---|---|---|---|
| 3,840,494 A | 10/1974 | Murayama et al. | |
| 2012/0057115 A1 | 3/2012 | Kunimatsu et al. | |
| 2015/0337202 A1* | 11/2015 | Furusato ............ | C09K 19/3483 252/299.61 |

FOREIGN PATENT DOCUMENTS

| | | |
|---|---|---|
| JP | S47-027981 | 10/1972 |
| JP | 2012-053394 | 3/2012 |

* cited by examiner

*Primary Examiner* — Geraldina Visconti
(74) *Attorney, Agent, or Firm* — Jianq Chyun IP Office

(57) ABSTRACT

A liquid crystal composition having at least one or a suitable balance regarding at least two of characteristic such as high maximum temperature of a nematic phase, low minimum temperature thereof, small viscosity, suitable optical anisotropy, large dielectric anisotropy, large specific resistance, high stability to ultraviolet-light or heat, or large elastic constant; an AM-device having short response time, a large voltage holding ratio, low threshold voltage, a large contrast ratio, a negatively large DC brightness relaxation time constant and long-service-life. The liquid crystal composition contains a compound contributing to high stability to heat or ultraviolet-light as an additive component and a specific compound having positively large dielectric anisotropy, and a liquid crystal display device includes the composition. The composition may contain a specific compound having high maximum temperature or small viscosity as a second component or a specific compound having negative dielectric anisotropy as a third component.

17 Claims, No Drawings

LIQUID CRYSTAL COMPOSITION AND LIQUID CRYSTAL DISPLAY DEVICE

CROSS-REFERENCE TO RELATED APPLICATION

This application claims the priority benefit of Japan application serial no. 2014-153674, filed on Jul. 29, 2014 and Japan application serial no. 2015-009403, filed on Jan. 21, 2015. The entirety of each of the above-mentioned patent applications is hereby incorporated by reference herein and made a part of this specification.

TECHNICAL FIELD

The invention relates to a liquid crystal composition, a liquid crystal display device including the composition and so forth. In particular, the invention relates to a liquid crystal composition having a positive dielectric anisotropy and an active matrix (AM) device that includes the composition and has a mode such as a TN mode, an OCB mode, an IPS mode, an FFS mode or an FPA mode.

BACKGROUND ART

In a liquid crystal display device, a classification based on an operating mode for liquid crystal molecules includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode and a field-induced photo-reactive alignment (FPA) mode. A classification based on a driving mode in the device includes a passive matrix (PM) and an active matrix (AM). The PM is classified into static, multiplex and so forth, and the AM is classified into a thin film transistor (TFT), a metal insulator metal (MIM) and so forth. The TFT is further classified into amorphous silicon and polycrystal silicon. The latter is classified into a high temperature type and a low temperature type according to a production process. A classification based on a light source includes a reflective type utilizing natural light, a transmissive type utilizing backlight and a transflective type utilizing both the natural light and the backlight.

The liquid crystal display devices include a liquid crystal composition having the nematic phase. The composition has suitable characteristics. An AM device having good characteristics can be obtained by improving the characteristics of the composition. Table 1 below summarizes a relationship of characteristics between two aspects. The characteristics of the composition will be further described based on a commercially available AM device. A temperature range of the nematic phase relates to a temperature range in which the device can be used. A preferred maximum temperature of the nematic phase is approximately 70° C. or higher, and a preferred minimum temperature of the nematic phase is approximately −10° C. or lower. Viscosity of the composition relates to a response time in the device. A short response time is preferred for displaying moving images on the device. A shorter response time even by one millisecond is desirable. Accordingly, a small viscosity in the composition is preferred. A small viscosity at a low temperature is further preferred. An elastic constant of the composition relates to contrast in the device. In order to increase the contrast in the device, a large elastic constant in the composition is further preferred.

TABLE 1

General Characteristics of Composition and AM Device

| No. | General Characteristics of Composition | General Characteristics of AM Device |
|---|---|---|
| 1 | Wide temperature range of a nematic phase | Wide usable temperature range |
| 2 | Small viscosity | Short response time |
| 3 | Suitable optical anisotropy | Large contrast ratio |
| 4 | Large positive or negative dielectric anisotropy | Low threshold voltage and small electric power consumption Large contrast ratio |
| 5 | Large specific resistance | Large voltage holding ratio and large contrast ratio |
| 6 | High stability to ultraviolet light and heat | Long service life |
| 7 | Large elastic constant | Large constant ratio and short response time |

An optical anisotropy of a composition relates to a contrast ratio in the device. According to a mode of the device, a large optical anisotropy or a small optical anisotropy, more specifically, a suitable optical anisotropy is required. A product ($\Delta n \times d$) of the optical anisotropy ($\Delta n$) of the composition and a cell gap (d) of the device is designed so as to maximize the contrast ratio. A suitable value of the product depends on a type of the operating mode. The suitable value is approximately 0.45 micrometer in a device having a mode such as the TN mode. In the above case, a composition having a large optical anisotropy is preferred for a device having a small cell gap. A large dielectric anisotropy in the composition contributes to a low threshold voltage, a small electric power consumption and a large contrast ratio in the device. Accordingly, the large dielectric anisotropy is preferred. A large specific resistance in the composition contributes to a large voltage holding ratio and a large contrast ratio in the device. Accordingly, a composition having a large specific resistance at room temperature and also at a temperature close to the maximum temperature of the nematic phase in an initial stage is preferred. A composition having a large specific resistance at room temperature and also at a temperature close to the maximum temperature of the nematic phase even after the device has been used for a long period of time is preferred. Stability of the composition to ultraviolet light and heat relates to a service life of the liquid crystal display device. In a case where the stability is high, the device has a long service life. Such characteristics are preferred for an AM device for use in a liquid crystal projector and a liquid crystal television and so forth.

As the liquid crystal display device is used for a long time, image persistence is caused by accumulation of electric charge in part of picture elements. Then, in order to prevent the image persistence, an additive for accelerating discharge of the electric charge accumulated in the picture element has been studied. A DC brightness relaxation time constant described in Patent literature No. 1 has been used as a measure of discharge. As a result, the liquid crystal display device containing the liquid crystal composition in which compound (1) described herein is added has been found to have a negatively large DC brightness relaxation time constant. In addition, compound (1) is disclosed by Patent literature No. 2.

CITATION LIST

Patent Literature

Patent literature No. 1: JP 2012-053394 A.
Patent literature No. 2: JP S47-027981 A.

SUMMARY OF INVENTION

Technical Problem

This invention provides a liquid crystal composition satisfying at least one of characteristics such as a high maximum temperature of a nematic phase, a low minimum temperature of the nematic phase, a small viscosity, a suitable optical anisotropy, a large dielectric anisotropy, a large specific resistance, a high stability to ultraviolet light, a high stability to heat and a large elastic constant. This invention also provides a liquid crystal composition having a suitable balance regarding at least two of the characteristics. This invention further provides a liquid crystal display device including such a composition. This invention further provides an AM device having characteristics such as a short response time, a large voltage holding ratio, a low threshold voltage, a large contrast ratio, a negatively large DC brightness relaxation time constant and a long service life.

Solution to Problem

The invention concerns a liquid crystal composition that has a positive dielectric anisotropy and a nematic phase, and contains at least one compound selected from the group of compounds represented by formula (1) as an additive component and at least one compound from the group of compounds represented by formula (2) as a first component, and a liquid crystal display device including the composition:

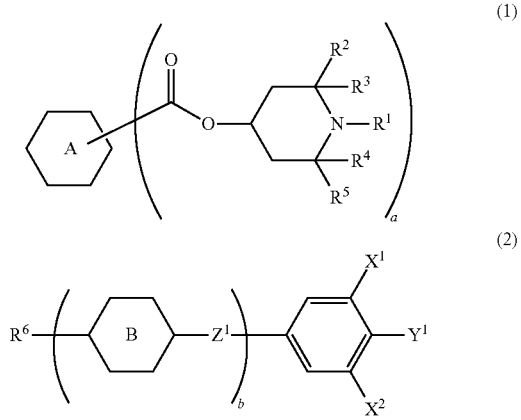

wherein, in formula (1), $R^1$ is hydrogen or alkyl having 1 to 15 carbons; $R^2$, $R^3$, $R^4$ and $R^5$ are independently hydrogen or alkyl having 1 to 4 carbons; ring A is a polyvalent group derived from benzene or cyclohexane by eliminating hydrogen; a is 3 or 4; and in formula (2), $R^6$ is alkyl having 1 to 12 carbons, alkoxy having 1 to 12 carbons or alkenyl having 2 to 12 carbons; ring B is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; $Z^1$ is a single bond, ethylene, carbonyloxy or difluoromethyleneoxy; $X^1$ and $X^2$ are independently hydrogen or fluorine; $Y^1$ is fluorine, chlorine, alkyl having 1 to 12 carbons in which at least one of hydrogen is replaced by fluorine or chlorine, alkoxy having 1 to 12 carbons in which at least one of hydrogen is replaced by fluorine or chlorine, or alkenyloxy having 2 to 12 carbons in which at least one of hydrogen is replaced by fluorine or chlorine; and b is 1, 2, 3 or 4.

The invention also concerns use of the liquid crystal composition in a liquid crystal display device.

Advantageous Effects of Invention

An advantage of the invention is to provide a liquid crystal composition satisfying at least one of characteristics such as a high maximum temperature of a nematic phase, a low minimum temperature of the nematic phase, a small viscosity, a suitable optical anisotropy, a large dielectric anisotropy, a large specific resistance, a high stability to ultraviolet light, a high stability to heat and a large elastic constant. Another advantage is a liquid crystal composition having a suitable balance regarding at least two of the characteristics. A further advantage is a liquid crystal display device including such a composition. A still further advantage is an AM device having characteristics such as a short response time, a large voltage holding ratio, a low threshold voltage, a large contrast ratio, a negatively large DC brightness relaxation time constant and a long service life.

DESCRIPTION OF EMBODIMENTS

Usage of terms herein is as described below. "Liquid crystal composition" and "liquid crystal display device" may be occasionally abbreviated as "composition" and "device," respectively. "Liquid crystal display device" is a generic term for a liquid crystal display panel and a liquid crystal display module. "Liquid crystal compound" is a generic term for a compound having a liquid crystal phase such as a nematic phase and a smectic phase and a compound having no liquid crystal phase but to be mixed with the composition for the purpose of adjusting characteristics such as a temperature range of the nematic phase, viscosity and dielectric anisotropy. The compound has a six-membered ring such as 1,4-cyclohexylene and 1,4-phenylene, and has rod-like molecular structure. "polymerizable compound" is added to the compound for the purpose of producing a polymer in the composition. At least one compound selected from the group of compounds represented by formula (1) may be occasionally abbreviated as "compound (1)." "Compound (1)" means one compound represented by formula (1), a mixture of two compounds or a mixture of three or more compounds represented thereby. A same rule applies to any other compound represented by any other formula.

The liquid crystal composition is prepared by mixing a plurality of liquid crystal compounds. A ratio (content) of the liquid crystal compounds is expressed in terms of weight percent (% by weight) based on the weight of the liquid crystal composition. An additive such as an optically active compound, an antioxidant, an ultraviolet light absorber, a dye, an antifoaming agent, a polymerizable compound, a polymerization initiator and a polymerization inhibitor is added to the liquid crystal composition, when necessary. A ratio (amount of addition) of the additive is expressed in terms of weight percent (% by weight) based on the weight of the liquid crystal composition in a manner similar to the ratio of the liquid crystal compounds. Weight parts per million (ppm) may be occasionally used. A ratio of the polymerization initiator and the polymerization inhibitor is exceptionally expressed based on the weight of the polymerizable compound.

"Higher limit of the temperature range of the nematic phase" may be occasionally abbreviated as "maximum temperature." "Lower limit of the temperature range of the nematic phase" may be occasionally abbreviated as "minimum temperature." An expression "having a large specific resistance" means that the composition has a large specific resistance at room temperature and also at a temperature close to the maximum temperature of the nematic phase in an initial stage, and that the composition has a large specific resistance at room temperature and also at a temperature close to the maximum temperature of the nematic phase even after the device has been used for a long period of time. An expression "having a large voltage holding ratio" means that the device has a large voltage holding ratio at room temperature and also at a temperature close to the maximum temperature of the nematic phase in an initial stage, and that the device has a large voltage holding ratio at room temperature and also at a temperature close to the maximum temperature of the nematic phase even after the device has been used for a long period of time.

An expression "at least one of 'A'" means that the number of 'A' is arbitrary. An expression "at least one of 'A' may be replaced by 'B'" means that a position of 'A' is arbitrary when the number of 'A' is one, and positions thereof when 'A' is two or more can also be selected without restriction. A same rule applies also to an expression "at least one of 'A' is replaced by 'B'."

A symbol of terminal group $R^6$ is used for a plurality of compounds in chemical formulas of component compounds. In the compounds, two groups represented by two of arbitrary $R^6$ may be identical or different. In one case, for example, $R^6$ of compound (2) is ethyl and $R^6$ of compound (2-1) is ethyl. In another case, $R^6$ of compound (2) is ethyl and $R^6$ of compound (2-1) is propyl. A same rule applies also to a symbol of any other terminal group or the like. In formula (2), when b is 2, two of ring B exist. In the compound, two rings represented by two of ring B may be identical or different. A same rule applies also to two of arbitrary ring B when b is larger than 2. A same rule applies also to $Z^2$, ring C or the like.

Then, 2-fluoro-1,4-phenylene means two of divalent groups described below. In the chemical formula, fluorine may be leftward (L) or rightward (R). A same rule applies also to an asymmetrical divalent group such as tetrahydropyran-2,5-diyl. A same rule applies also to a bonding group such as carbonyloxy (—COO— and —OCO—).

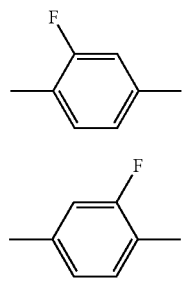

The invention includes the items described below.

Item 1. A liquid crystal composition that has a positive dielectric anisotropy and a nematic phase, and contains at least one compound selected from the group of compounds represented by formula (1) as an additive component and at least one compound from the group of compounds represented by formula (2) as a first component:

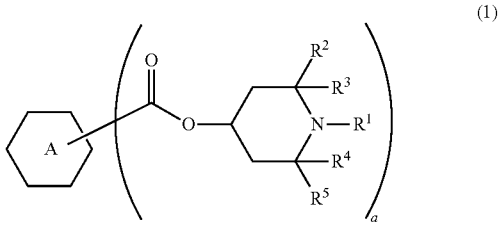

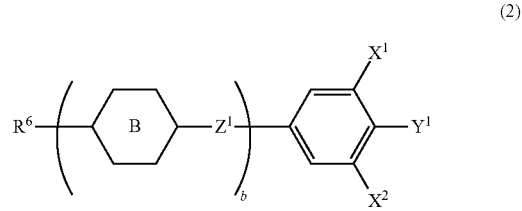

wherein, in formula (1), $R^1$ is hydrogen or alkyl having 1 to 15 carbons; $R^2$, $R^3$, $R^4$ and $R^5$ are independently hydrogen or alkyl having 1 to 4 carbons; ring A is a polyvalent group derived from benzene or cyclohexane by eliminating hydrogen; a is 3 or 4; and in formula (2), $R^6$ is alkyl having 1 to 12 carbons, alkoxy having to 12 carbons or alkenyl having 2 to 12 carbons; ring B is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; $Z^1$ is a single bond, ethylene, carbonyloxy or difluoromethyleneoxy; $X^1$ and $X^2$ are independently hydrogen or fluorine; $Y^1$ is fluorine, chlorine, alkyl having 1 to 12 carbons in which at least one of hydrogen is replaced by fluorine or chlorine, alkoxy having 1 to 12 carbons in which at least one of hydrogen is replaced by fluorine or chlorine, or alkenyloxy having 2 to 12 carbons in which at least one of hydrogen is replaced by fluorine or chlorine; and b is 1, 2, 3 or 4.

Item 2. The liquid crystal composition according to item 1, containing a compound represented by formula (1-1) or formula (1-2) as the additive component:

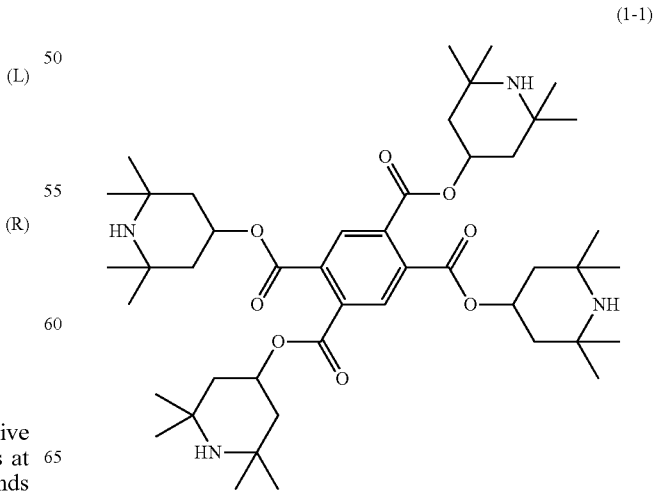

(1-2)

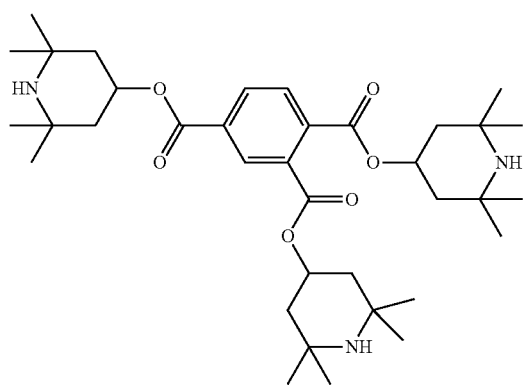

Item 3. The liquid crystal composition according to item 1 or 2, wherein a ratio of the additive component is in the range of 0.005% by weight to 1% by weight based on the weight of the liquid crystal composition.

Item 4. The liquid crystal composition according to any one of items 1 to 3, containing at least one compound selected from the group of compounds represented by formula (2-1) to (2-35) as the first component:

(2-1)
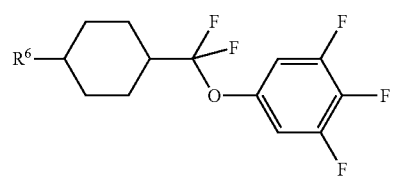

(2-2)
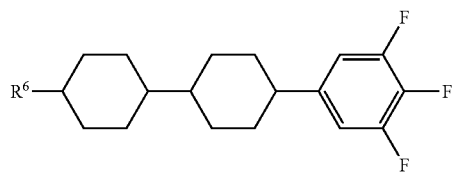

(2-3)
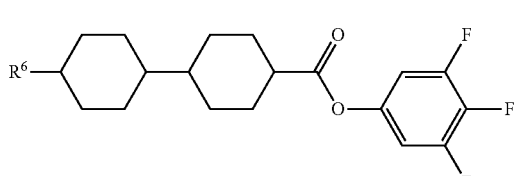

(2-4)
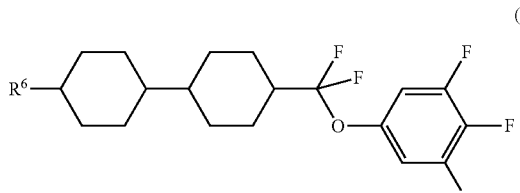

(2-5)
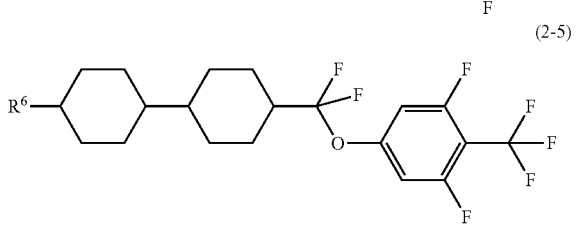

(2-6)
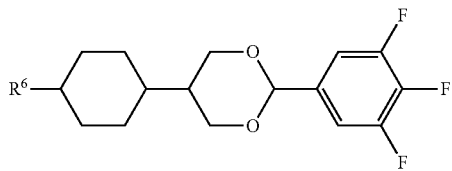

(2-7)
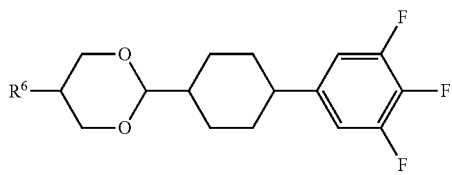

(2-8)
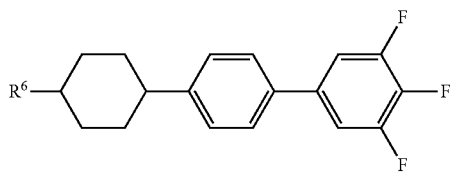

(2-9)
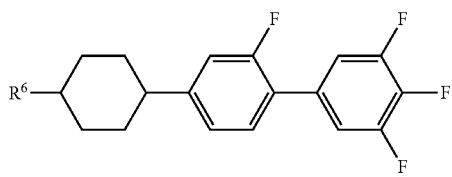

(2-10)
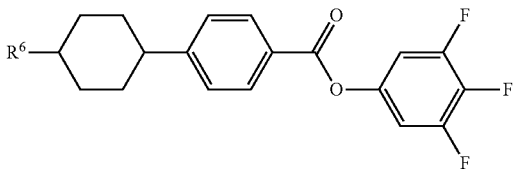

(2-11)
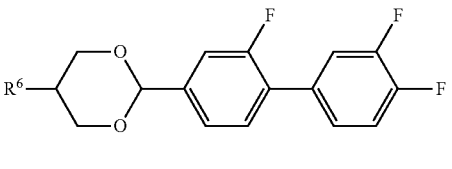

(2-12)
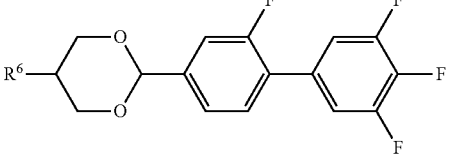

(2-13)
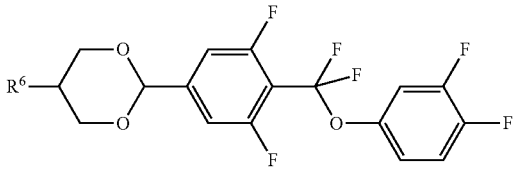

(2-14)
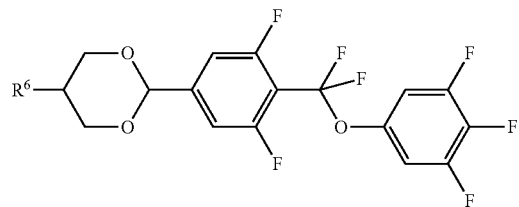
(2-15)
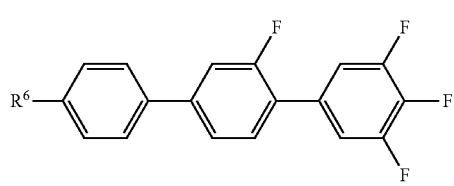
(2-16)
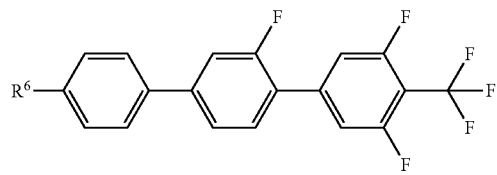
(2-17)
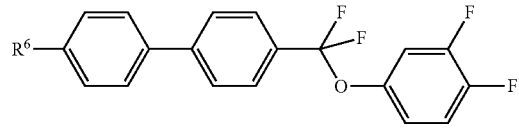
(2-18)
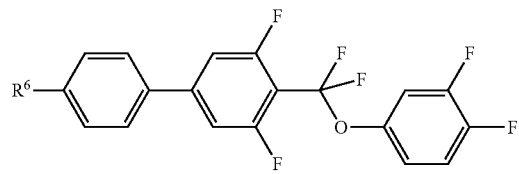
(2-19)
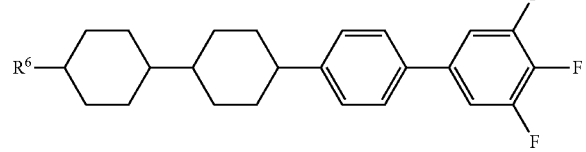
(2-20)
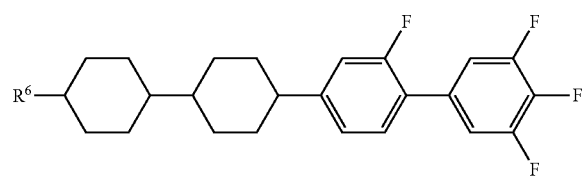
(2-21)
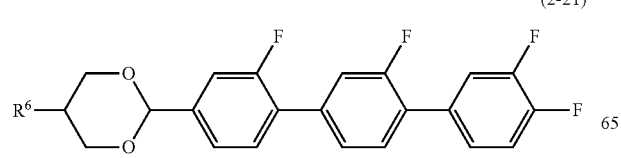
(2-22)
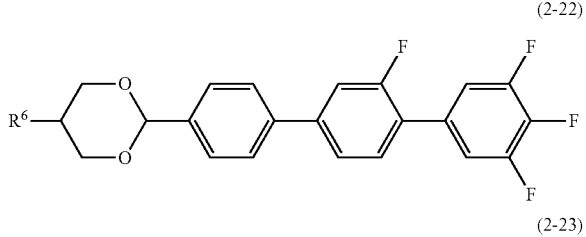
(2-23)
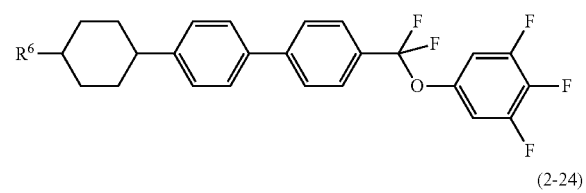
(2-24)
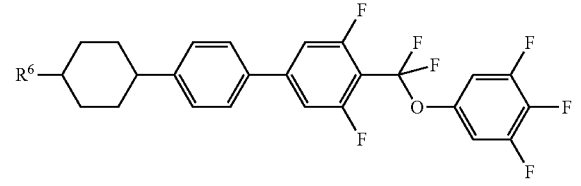
(2-25)
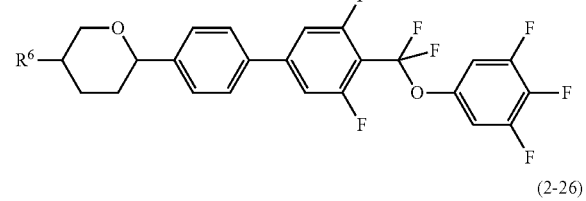
(2-26)
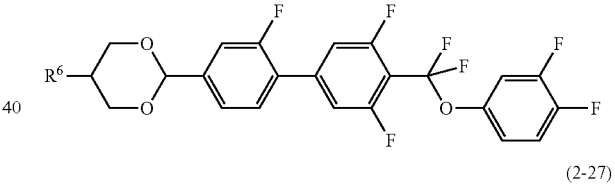
(2-27)
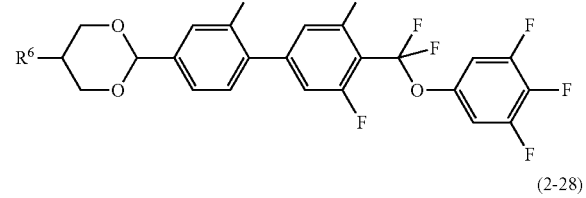
(2-28)
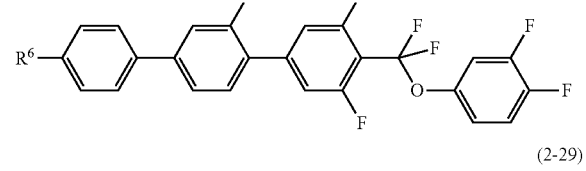
(2-29)
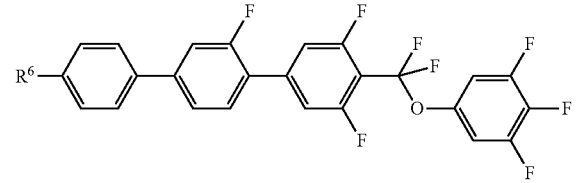

-continued (2-30)
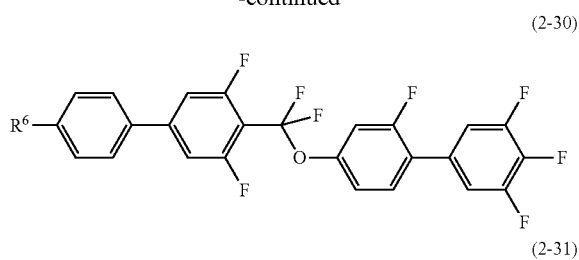

(2-31)

(2-32)
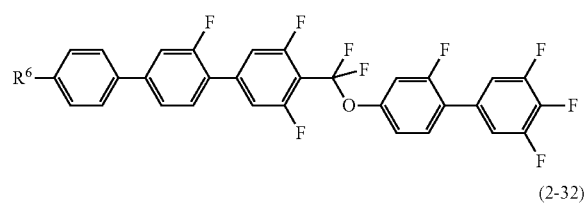

(2-33)
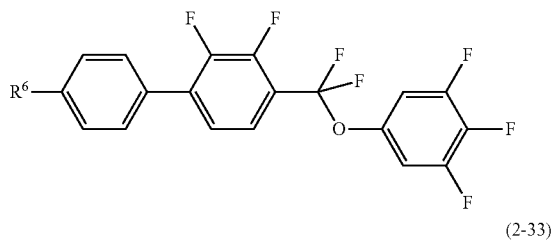

(2-34)
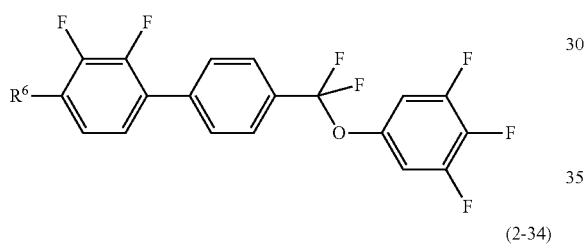

(2-35)
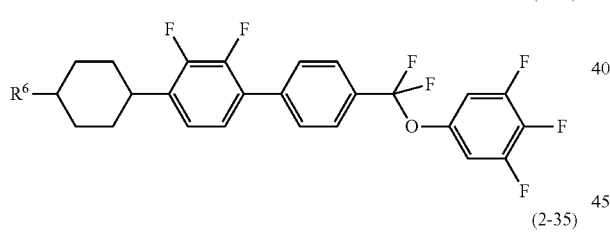
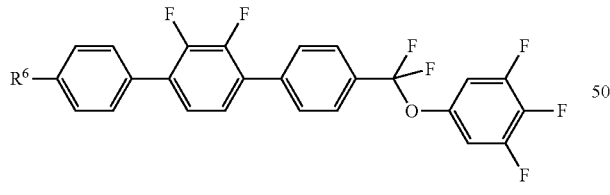

wherein, in formula (2-1) to (2-35), $R^6$ is alkyl having 1 to 12 carbons, alkoxy having 1 to 12 carbons or alkenyl having 2 to 12 carbons.

Item 5. The liquid crystal composition according to any one of items 1 to 4, wherein a ratio of the first component is in the range of 10% by weight to 90% by weight based on the weight of the liquid crystal composition.

Item 6. The liquid crystal composition according to any one of items 1 to 5, containing at least one compound selected from the group of compounds represented by formula (3) as a second component:

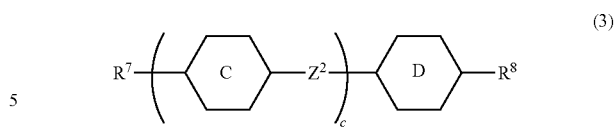
(3)

wherein, in formula (3), $R^7$ and $R^8$ are independently alkyl having 1 to 12 carbons, alkoxy having 1 to 12 carbons, alkenyl having 2 to 12 carbons, alkyl having 1 to 12 carbons in which at least one of hydrogen is replaced by fluorine or chlorine, or alkenyl having 2 to 12 carbons in which at least one of hydrogen is the replaced by fluorine or chlorine; ring C and ring D are independently 1,4-cyclohexylene, 1,4-phenylene, 2-fluoro-1,4-phenylene or 2,5-difluoro-1,4-phenylene; $Z^2$ is a single bond, ethylene or carbonyloxy; and c is 1, 2 or 3.

Item 7. The liquid crystal composition according to any one of items 1 to 6, containing at least one compound selected from the group of compounds represented by formula (3-1) to (3-13) as the second component:

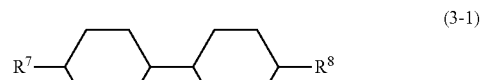
(3-1)

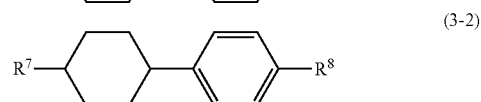
(3-2)

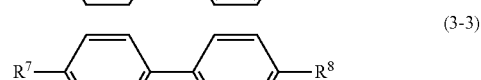
(3-3)

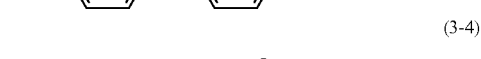
(3-4)

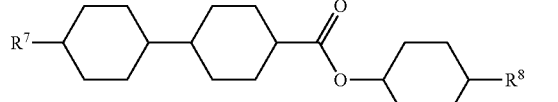
(3-5)

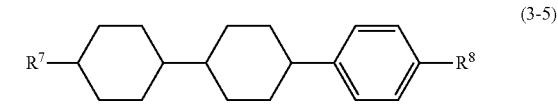
(3-6)

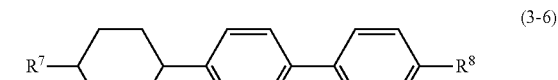
(3-7)

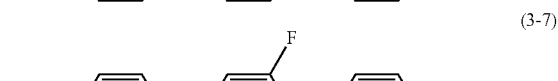
(3-8)

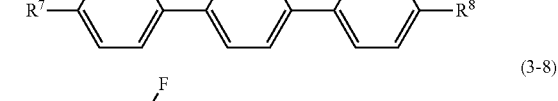
(3-9)

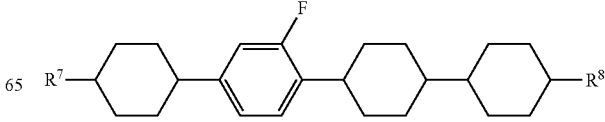

-continued (3-10)
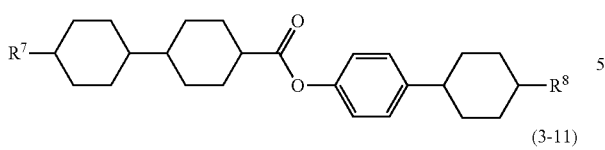

(3-11)
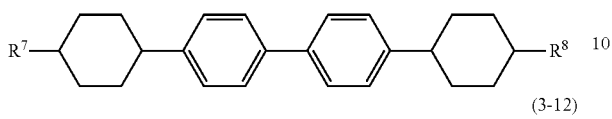

(3-12)
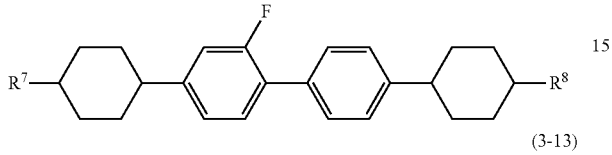

(3-13)
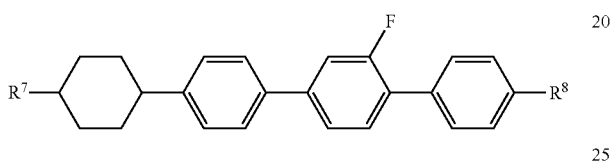

wherein, in formula (3-1) to formula (3-13), $R^7$ and $R^8$ are independently alkyl having 1 to 12 carbons, alkoxy having 1 to 12 carbons, alkenyl having 2 to 12 carbons, alkyl having 1 to 12 carbons in which at least one of hydrogen is replaced by fluorine or chlorine, or alkenyl having 2 to 12 carbons in which at least one of hydrogen is replaced by fluorine or chlorine.

Item 8. The liquid crystal composition according to item 6 or 7, wherein a ratio of the second component is in the range of 10% by weight to 90% by weight based on the weight of the liquid crystal composition.

Item 9. The liquid crystal composition according to any one of items 1 to 8, containing at least one compound selected from the group of compounds represented by formula (4) as a third component:

(4)
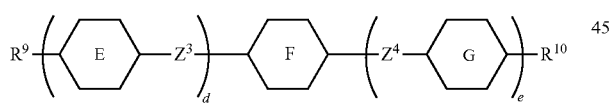

wherein, in formula (4), $R^9$ and $R^{10}$ are independently alkyl having 1 to 12 carbons, alkoxy having 1 to 12 carbons, alkenyl having 2 to 12 carbons, or alkyl having 1 to 12 carbons in which at least one of hydrogen is replaced by fluorine or chlorine; ring E and ring G are independently 1,4-cyclohexylene, 1,4-cyclohexenylene, 1,4-phenylene, 1,4-phenylene in which at least one of hydrogen is replaced by fluorine or chlorine, or tetrahydropyran-2,5-diyl; ring F is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, ethylene, carbonyloxy or methyleneoxy; d is 1, 2 or 3, and e is 0 or 1; and a sum of d and e is 3 or less.

Item 10. The liquid crystal composition according to any one of items 1 to 9, containing at least one compound selected from the group of compounds represented by formula (4-1) to formula (4-21) as the third component:

(4-1)
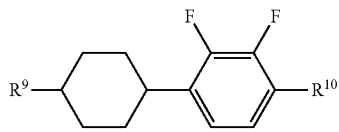

(4-2)
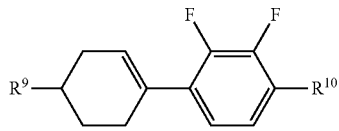

(4-3)
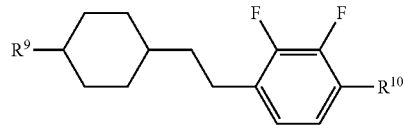

(4-4)
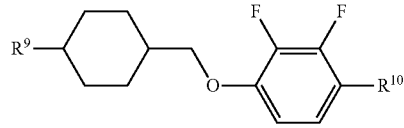

(4-5)
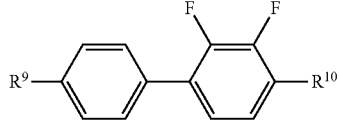

(4-6)
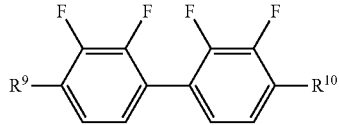

(4-7)
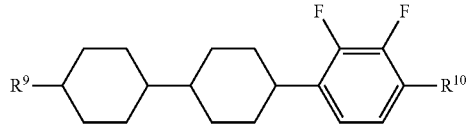

(4-8)
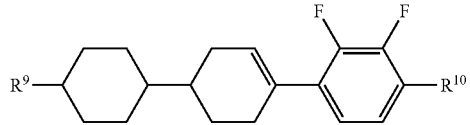

(4-9)
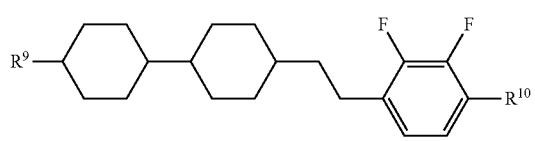

(4-10)
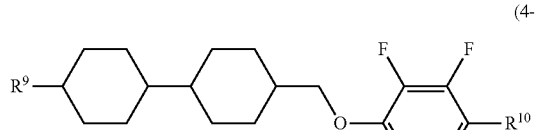

(4-11)
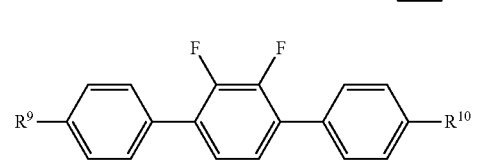

having 2 to 12 carbons, or alkyl having 1 to 12 carbons in which at least one of hydrogen is replaced by fluorine or chlorine.

Item 11. The liquid crystal composition according to item 9 or 10, wherein a ratio of the third component is in the range of 3% by weight to 25% by weight based on the weight of the liquid crystal composition.

Item 12. The liquid crystal composition according to any one of items 1 to 11, wherein a maximum temperature of a nematic phase is 70° C. or higher, optical anisotropy (measured at 25° C.) at a wavelength of 589 nanometers is 0.07 or more, and dielectric anisotropy (measured at 25° C.) at a frequency of 1 kHz is 2 or more.

Item 13. A liquid crystal display device including the liquid crystal composition according to any one of items 1 to 12.

Item 14. The liquid crystal display device according to item 13, wherein an operating mode of the liquid crystal display device includes a TN mode, an ECB mode, an OCB mode, an IPS mode, an FFS mode or an FPA mode, and a driving mode of the liquid crystal display device includes an active matrix mode.

Item 15. Use of the liquid crystal composition according to any one of items 1 to 12 in a liquid crystal display device.

The invention further includes the following items: (a) the composition, further containing at least one additive such as an optically active compound, an antioxidant, an ultraviolet light absorber, a dye, an antifoaming agent, a polymerizable compound, a polymerization initiator or a polymerization inhibitor; (b) an AM device including the composition; (c) the composition, further including the polymerizable compound, and a polymer sustained alignment (PSA) mode AM device, including the composition; (d) a polymer sustained alignment (PSA) mode AM device, wherein the device includes the composition, and the polymerizable compound in the composition is polymerized; (e) a device, including the composition and having a PC, TN, STN, ECB, OCB, IPS, FFS or FPA mode; (f) a transmissive device including the composition; (g) use of the composition as the composition having the nematic phase; and (h) use as an optical active composition by adding the optically active compound to the composition.

The composition of the invention will be described in the following order. First, a constitution of component compounds in the composition will be described. Second, main characteristics of the component compounds and main effects of the compounds on the composition will be described. Third, a combination of components in the composition, a preferred ratio of the component and the basis thereof will be described. Fourth, a preferred embodiment of the component compounds will be described. Fifth, a preferred component compound will be shown. Sixth, an additive that may be added to the composition will be described. Seventh, a method for synthesizing the component compound will be described. Last, an application of the composition will be described.

First, the constitution of the component compounds in the composition will be described. The composition of the invention is classified into composition A and composition B. Composition A may further contain any other liquid crystal compound, the additive or the like in addition to the liquid crystal compound selected from compound (2), compound (3) and compound (4). "Any other liquid crystal compound" means a liquid crystal compound different from compound (2), compound (3) and compound (4). Such a compound is mixed with the composition for the purpose of further adjusting the characteristics of the composition. The wherein, in formula (4-1) to formula (4-21), $R^9$ and $R^{10}$ are independently alkyl having 1 to 12 carbons, alkoxy having 1 to 12 carbons, alkenyl having 2 to 12 carbons, alkenyloxy additive includes compound (1), the optically active compound, the antioxidant, the ultraviolet light absorber, the dye, the antifoaming agent, the polymerizable compound, the polymerization initiator and the polymerization inhibitor.

Composition B consists essentially of liquid crystal compounds selected from compound (2), compound (3) and compound (4). A term "essentially" means that the composition may contain the additive, but does not contain any other liquid crystal compound. An example of composition B includes a component containing compound (1), compound (2) and compound (3) as essential components. Composition B has a smaller number of components than composition A has. Composition B is preferred to composition A in view of cost reduction. Composition A is preferred to composition B in view of possibility of further adjusting the characteristics of the composition by mixing any other liquid crystal compound.

Second, the main characteristics of the component compound and the main effects of the compounds on the characteristics of the composition will be described. The main characteristics of the component compounds are summarized in Table 2 on the basis of advantageous effects of the invention. In Table 2, a symbol L stands for "large or high," a symbol M stands for "medium," and a symbol S stands for "small or low." The symbols L, M and S represent a classification based on a qualitative comparison among the component compounds, and 0 (zero) means that a value is zero or nearly zero.

TABLE 2

Characteristics of Compounds

| Compounds | Compound (2) | Compound (3) | Compound (4) |
|---|---|---|---|
| Maximum temperature | S to L | S to L | S to M |
| Viscosity | M to L | S to M | L |
| Optical anisotropy | M to L | S to L | M to L |
| Dielectric anisotropy | S to L[1)] | 0 | L[2)] |
| Specific resistance | L | L | L |

[1)]Compound having positive dielectric anisotropy.
[2)]Compound having negative dielectric anisotropy Upon mixing the component compounds to the composition, the main effects of the component compounds on the characteristics of the composition are as described below. Compound (1) contributes to a high stability to heat or ultraviolet light. Compound (1) also contributes to a negatively large DC brightness relaxation time constant. Compound (1) have no influence on the characteristics such as the maximum temperature, the optical anisotropy and the dielectric anisotropy. Compound (2) increases the dielectric anisotropy. Compound (3) increases the maximum temperature or decreases the minimum temperature. Compound (4) increases a dielectric constant in a minor axis direction.

Third, the combination of component compound in the composition, the preferred ratio of the component compounds and the basis thereof will be described. The preferred combination of components in the composition includes a combination of compound (1) and compound (2), a combination of compound (1), compound (2) and compound (3), a combination of compound (1), compound (2) and compound (4), or a combination of compound (1), compound (2), compound (3) and compound (4). A further preferred combination is the combination of compound (1), compound (2) and compound (3), or the combination of compound (1), compound (2), compound (3) and compound (4).

A preferred ratio of compound (1) is approximately 0.005% by weight or more for contributing to the high stability to heat or ultraviolet light and contributing to the negatively large DC brightness relaxation time constant, and approximately 1% by weight or less for decreasing the minimum temperature. A further preferred ratio is in the range of approximately 0.01% to approximately 0.5% by weight. A particularly preferred ratio is in the range of approximately 0.03% to approximately 0.3% by weight.

A preferred ratio of compound (2) is approximately 10% by weight or more for increasing the dielectric anisotropy, and approximately 90% by weight or less for decreasing the minimum temperature or decreasing the viscosity. A further preferred ratio is in the range of approximately 20% by weight to approximately 80% by weight. A particularly preferred ratio is in the range of approximately 30% by weight to approximately 70% by weight.

A preferred ratio of compound (3) is in the range of approximately 10% by weight or more for increasing the maximum temperature or decreasing the viscosity, and approximately 90% by weight or less for increasing the dielectric anisotropy. A further preferred ratio is in the range of approximately 20% by weight to approximately 80% by weight. A particularly preferred ratio is in the range of approximately 25% by weight to approximately 70% by weight.

A preferred ratio of compound (4) is approximately 3% by weight or more for increasing the dielectric anisotropy, and approximately 25% by weight or less for decreasing the minimum temperature. A further preferred ratio is in the range of approximately 5% by weight to approximately 20% by weight. A particularly preferred ratio is in the range of approximately 5% by weight to approximately 15% by weight.

Fourth, the preferred embodiment of the component compounds will be described. In formula (1), $R^1$ is hydrogen or alkyl having 1 to 15 carbons. Preferred $R^1$ is hydrogen or methyl. $R^2$, $R^3$, $R^4$ and $R^5$ are independently hydrogen or alkyl having 1 to 4 carbons. Preferred $R^2$, $R^3$, $R^4$ or $R^5$ is hydrogen or methyl.

Ring A is a polyvalent group derived from benzene or cyclohexane by eliminating hydrogen. Then, a is 3 or 4. Accordingly, ring A is trivalent or tetravalent. Preferred ring A is a trivalent group or a tetravalent group derived from benzene. Further preferred ring A is a tetravalent group derived from benzene.

In formula (2), formula (3) and formula (4), $R^6$ is alkyl having 1 to 12 carbons, alkoxy having 1 to 12 carbons, or alkenyl having 2 to 12 carbons. Preferred $R^6$ is alkyl having 1 to 12 carbons for increasing the stability to ultraviolet light or heat. $R^7$ and $R^8$ are independently alkyl having 1 to 12 carbons, alkoxy having 1 to 12 carbons, alkenyl having 2 to 12 carbons, alkyl having 1 to 12 carbons in which at least one of hydrogen is replaced by fluorine or chlorine, or alkenyl having 2 to 12 carbons in which at least one of hydrogen is replaced by fluorine or chlorine. Preferred $R^7$ or $R^8$ is alkenyl having 2 to 12 carbons for decreasing the viscosity, and alkyl having 1 to 12 carbons for increasing the stability. $R^9$ and $R^{10}$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one of hydrogen is replaced by fluorine or chlorine. Preferred $R^9$ or $R^{10}$ is alkyl having 1 to 12 carbons for increasing the stability, and alkoxy having 1 to 12 carbons for increasing the dielectric anisotropy.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

A preferred example of alkyl in which at least one of hydrogen is replaced by fluorine or chlorine, includes fluoromethyl, 2-fluoroethyl, 3-fluoropropyl, 4-fluorobutyl, 5-fluoropentyl, 6-fluorohexyl, 7-fluoroheptyl or 8-fluorooctyl. A further preferred example includes 2-fluoroethyl, 3-fluoropropyl, 4-fluorobuty or 5-fluoropentyl for increasing the dielectric anisotropy.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH=CH— in the alkenyl depends on a position of a double bond. Trans is preferred in alkenyl such as 1-propenyl, 1-butenyl, 1-pentenyl, 1-hexenyl, 3-pentenyl and 3-hexenyl for decreasing the viscosity, for instance. Cis is preferred in alkenyl such as 2-butenyl, 2-pentenyl and 2-hexenyl. In the alkenyl, straight-chain alkenyl is preferred to branched-chain alkenyl.

A preferred example of alkenyl in which at least one of hydrogen is replaced by fluorine or chlorine includes 2,2-difluorovinyl, 3,3-difluoro-2-propenyl, 4,4-difluoro-3-butenyl, 5,5-difluoro-4-pentenyl or 6,6-difluoro-5-hexenyl. A further preferred example includes 2,2-difluorovinyl or 4,4-difluoro-3-butenyl for decreasing the viscosity.

Preferred alkenyloxy is vinyloxy, allyloxy, 3-butenyloxy, 3-pentenyloxy or 4-pentenyloxy. Further preferred alkenyloxy is allyloxy or 3-butenyloxy for decreasing the viscosity.

Then, b is 1, 2, 3 or 4. Preferred b is 2 for decreasing the minimum temperature, and 3 for increasing the dielectric anisotropy. Then, c is 1, 2 or 3. Preferred c is 1 for decreasing the viscosity, and 2 or 3 for increasing the maximum temperature. Then, d is 1, 2 or 3, e is 0 or 1, and a sum of d and e is 3 or less. Preferred d is 1 for decreasing the viscosity, and 2 or 3 for increasing the maximum temperature. Preferred e is 0 for decreasing the viscosity, and 1 for decreasing the minimum temperature.

$Z^1$ is a single bond, ethylene, carbonyloxy or difluoromethyleneoxy. Preferred $Z^1$ is a single bond for decreasing the viscosity, and difluoromethyleneoxy for increasing the dielectric anisotropy. $Z^2$ is a single bond, ethylene, or carbonyloxy. Preferred $Z^2$ is a single bond for decreasing the viscosity. $Z^3$ and $Z^4$ are independently a single bond, ethylene, carbonyloxy or methyleneoxy. Preferred $Z^3$ or $Z^4$ is a single bond for decreasing the viscosity, and methyleneoxy for increasing the dielectric anisotropy.

Ring B is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl. Preferred ring B is 1,4-phenylene or 2-fluoro-1,4-phenylene for increasing the optical anisotropy. Ring C and ring D are independently 1,4-cyclohexylene, 1,4-phenylene, 2-fluoro-1,4-phenylene or 2,5-difluoro-1,4-phenylene. Preferred ring C or ring D is 1,4-cyclohexylene for decreasing the viscosity, or 1,4-phenylene for increasing the optical anisotropy.

Ring E and ring G are independently 1,4-cyclohexylene, 1,4-cyclohexenylene, 1,4-phenylene, 1,4-phenylene in which at least one of hydrogen is replaced by fluorine or chlorine, or tetrahydropyran-2,5-diyl. A preferred example of "1,4-phenylene in which at least one of hydrogen is replaced by fluorine or chlorine" includes 2-fluoro-1,4-phenylene, 2,3-difluoro-1,4-phenylene or 2-chloro-3-fluoro-1,4-phenylene. Preferred ring E or ring G is 1,4-cyclohexylene for decreasing the viscosity, tetrahydropyran-2,5-diyl for increasing the dielectric anisotropy and 1,4-phenylene for increasing the optical anisotropy. Ring F is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Preferred ring F is 2,3-difluoro-1,4-phenylene for increasing the dielectric anisotropy. With regard to a configuration of 1,4-cyclohexylene, trans is preferred to cis for increasing the maximum temperature. Tetrahydropyran-2,5-diyl includes:

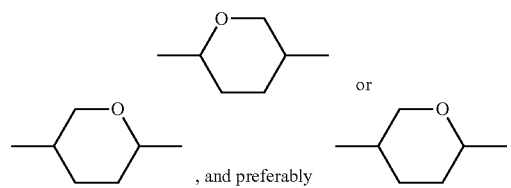

$X^1$ and $X^2$ are independently hydrogen or fluorine. Preferred $X^1$ or $X^2$ is fluorine for increasing the dielectric anisotropy.

$Y^1$ is fluorine, chlorine, alkyl having 1 to 12 carbons in which at least one of hydrogen is replaced by fluorine or chlorine, alkoxy having 1 to 12 carbons in which at least one of hydrogen is replaced by fluorine or chlorine, or alkenyloxy having 2 to 12 carbons in which at least one of hydrogen is replaced by fluorine or chlorine. A preferred example of alkyl in which at least one of hydrogen is replaced by fluorine or chlorine, includes trifluoromethyl. A preferred example of alkoxy in which at least one of hydrogen is replaced by fluorine or chlorine, includes trifluoromethoxy. A preferred example of alkenyloxy in which at least one of hydrogen is replaced by fluorine or chlorine, includes trifluorovinyloxy. Preferred $Y^1$ is fluorine or trifluoromethyl. Further preferred $Y^1$ is fluorine for decreasing the minimum temperature.

Fifth, the preferred component compound will be shown. Preferred compound (1) includes compound (1-1) and compound (1-2) as described in item 2. Further preferred compound (1) includes compound (1-1).

Preferred compound (2) includes compound (2-1) to compound (2-35) as described in item 4. In the compounds, at least one of the second components preferably includes compound (2-4), compound (2-12), compound (2-14), compound (2-15), compound (2-17), compound (2-18), compound (2-23), compound (2-27), compound (2-29) or compound (2-30). At least two of the second components preferably includes a combination of compound (2-12) and compound (2-15), a combination of compound (2-14) and compound (2-27), a combination of compound (2-18) and compound (2-24), a combination of compound (2-18) and compound (2-29), a combination of compound (2-24) and compound (2-29) or a combination of compound (2-29) and compound (2-30).

Preferred compound (3) includes compound (3-1) to compound (3-13) as described in item 7. In the compounds, at least one of the third component preferably includes compound (3-1), compound (3-3), compound (3-5), compound (3-6), compound (3-7) or compound (3-13). At least two of the third components preferably includes a combination of compound (3-1) and compound (3-3), a combination of compound (3-1) and compound (3-5) or a combination of compound (3-1) and compound (3-7).

Preferred compound (4) includes compound (4-1) to compound (4-21) as described in item 10. In the compounds, at least one of the fourth component preferably includes compound (4-1), compound (4-4), compound (4-5), compound (4-7), compound (4-10) or compound (4-15). At least two of the fourth components preferably includes a combination of compound (4-1) and a compound (4-7), a combination of compound (4-1) and compound (4-15), a combination of compound (4-4) and compound (4-7), a combination of compound (4-4) and compound (4-15), a combination of compound (4-5) and compound (4-7) or a combination of compound (4-5) and compound (4-10).

Sixth, the additive that may be added to the composition will be described. Such an additive includes the optically active compound, the antioxidant, the ultraviolet light absorber, the dye, the antifoaming agent, the polymerizable compound, the polymerization initiator and the polymerization inhibitor. The optically active compound is added to the composition for the purpose of inducing a helical structure of a liquid crystal molecule to give a twist angle. An example of such a compound includes compound (5-1) to compound (5-5). A preferred ratio of the optically active compound is approximately 5% by weight or less. A further preferred ratio is in the range of approximately 0.01% by weight to approximately 2% by weight.

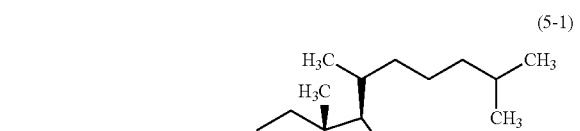
(5-1)

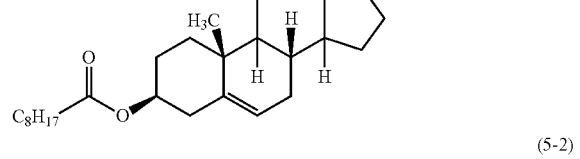
(5-2)

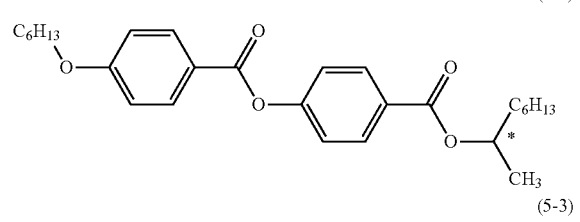
(5-3)

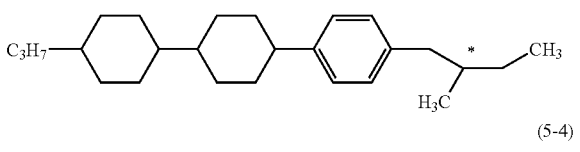
(5-4)

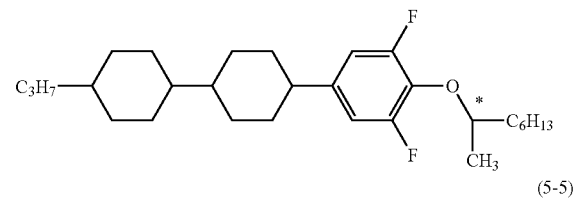
(5-5)

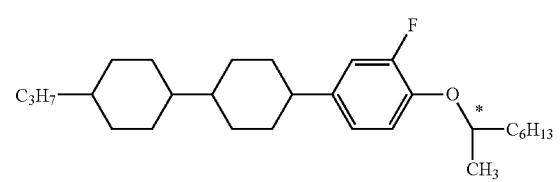

The antioxidant is added to the composition for the purpose of preventing a decrease in the specific resistance caused by heating in air, or maintaining a large voltage holding ratio at room temperature and also at a temperature close to the maximum temperature even after the device has been used for a long period of time. A preferred example of the antioxidant includes compound (6) where t is an integer from 1 to 9.

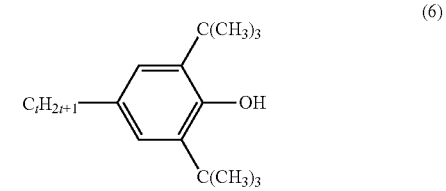
(6)

In compound (6), preferred t is 1, 3, 5, 7 or 9. Further preferred t is 7. Compound (6) where t is 7 is effective in maintaining a large voltage holding ratio at room temperature and also at a temperature close to the maximum temperature even after the device has been used for a long period of time because such compound (6) has a small volatility. A preferred ratio of the antioxidant is approximately 50 ppm or more for achieving the effect thereof, and approximately 600 ppm or less for avoiding a decrease in the maximum temperature or avoiding an increase in the minimum temperature. A further preferred ratio is in the range of approximately 100 ppm to approximately 300 ppm.

A preferred example of the ultraviolet light absorber includes a benzophenone derivative, a benzoate derivative and a triazole derivative. A light stabilizer such as an amine having steric hindrance is also preferred. A preferred ratio of the ultraviolet light absorber or the stabilizer is approximately 50 ppm or more for achieving the effect thereof, and approximately 10,000 ppm or less for avoiding a decrease in the maximum temperature or avoiding an increase in the minimum temperature. A further preferred ratio is in the range of approximately 100 ppm to approximately 10,000 ppm.

A dichroic dye such as an azo dye or an anthraquinone dye is added to the composition to be adapted for a device having a guest host (GH) mode. A preferred ratio of the dye is in the range of approximately 0.01% by weight to approximately 10% by weight. The antifoaming agent such as dimethyl silicone oil or methyl phenyl silicone oil is added to the composition for preventing foam formation. A preferred ratio of the antifoaming agent is approximately 1 ppm or more for achieving the effect thereof, and approximately 1,000 ppm or less for preventing poor display. A further preferred ratio is in the range of approximately 1 ppm to approximately 500 ppm.

The polymerizable compound is added to the composition to be adapted for the polymer sustained alignment (PSA) mode device. A preferred example of the polymerizable compound includes a compound containing a polymerizable group, such as an acrylate, a methacrylate, a vinyl compound, a vinyloxy compound, a propenyl ether, an epoxy compound (oxirane and oxetane) and a vinyl ketone. A further preferred example includes a derivative of acrylate or methacrylate. A preferred ratio of the polymerizable compound is in the range of approximately 0.05% by weight or more for achieving the effect thereof and approximately 10% by weight or less for preventing poor display. A further preferred ratio is in the range of approximately 0.1% by weight to approximately 2% by weight. The polymerizable compound is polymerized by irradiation with ultraviolet light. The polymerizable compound may be polymerized in the presence of an initiator such as a photopolymerization initiator. Suitable conditions for polymerization, suitable types of the initiator and suitable amounts are known to those skilled in the art and are described in literature. For example, Irgacure 651 (registered trademark; BASF), Irgacure 184 (registered trademark; BASF) or Darocur 1173 (registered trademark; BASF), each being a photoinitiator, is suitable for radical polymerization. A preferred ratio of the photopolymerization initiator is in the range of approximately 0.1% by weight to approximately 5% by weight based on the weight of the polymerizable compound. A further preferred ratio is in the range of approximately 1% by weight to approximately 3% by weight.

When the polymerizable compound is stored, the polymerization inhibitor may be added in order to prevent polymerization. The polymerizable compound is ordinarily added to the composition without eliminating the polymerization inhibitor. An example of the polymerization inhibitor includes hydroquinone, a hydroquinone derivative such as methyl hydroquinone, 4-tert-butyl-catechol, 4-methoxyphenol and phenothiazine.

Seventh, the methods for synthesizing the component compounds will be described. The compounds can be prepared by a known method. Examples of synthetic methods will be presented. Compound (1-1) is prepared by the method described in JP S47-027981 A. Compound (2-2) and compound (2-8) are prepared by the method described in JP H2-233626 A. Compound (3-1) is prepared by the method described in JP S59-176221 A. Compound (4-1) and compound (4-7) are prepared by the method described in JP H2-503441 A. The antioxidant is commercially available. The compound represented by formula (6) where t is 1 is available from Sigma-Aldrich Corporation. Compound (6) where t is 7 and so forth are prepared according to the method described in U.S. Pat. No. 3,660,505 B.

Any compounds whose synthetic methods are not described above can be prepared by the methods described in books such as Organic Syntheses (John Wiley & Sons, Inc.), Organic Reactions (John Wiley & Sons, Inc-Comprehensive Organic Synthesis (Pergamon Press), New Experimental Chemistry Course (Shin Jikken Kagaku Koza in Japanese) (Maruzen Co., Ltd.) and so forth. The composition is prepared according to a publicly known method using the thus obtained compounds. For example, the component compounds are mixed and dissolved in each other by heating.

Last, the application of the composition will be described. The composition of the invention mainly has a minimum temperature of approximately −10° C. or lower, a maximum temperature of approximately 70° C. or higher and an optical anisotropy in the range of approximately 0.07 to approximately 0.20. The composition having an optical anisotropy in the range of approximately 0.08 to approximately 0.25, and also the composition having an optical anisotropy in the range of approximately 0.10 to approximately 0.30 may be prepared by controlling the ratio of the component compound or by mixing with any other liquid crystal compound. A device including the composition has a large voltage holding ratio. The composition is suitable for use in the AM device. The composition is particularly suitable for use in a transmissive AM device. The composition can be used as the composition having the nematic phase and as the optically active composition by adding the optically active compound.

The composition can be used for the AM device. The composition can also be used for a PM device. The composition can be used for an AM device and a PM device having a mode such as PC, TN, STN, ECB, OCB, IPS, FFS, VA or FPA mode. Use for the AM device having TN, OCB, IPS mode or FFS mode is particularly preferred. In the AM device having the IPS mode or FFS mode, alignment of liquid crystal molecules in a state in which no voltage is applied may be parallel or perpendicular relative to a glass substrate. The devices may be of a reflective type, a transmissive type or a transreflective type. Use for the transmissive device is preferred. The composition can also be used for an amorphous silicon-TFT device or a polycrystal silicon-TFT device. The composition can also be used for a nematic curvilinear aligned phase (NCAP) mode device prepared by microencapsulating the composition and for a polymer dispersed (PD) mode device in which a three-dimensional network polymer is formed in the composition.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

The invention will be described in greater details by way of Examples. The invention is not restricted by the Examples. The invention includes a mixture of a composition in Example 1 and a composition in Example 2. The invention also includes a mixture prepared by mixing at least two compositions in Examples. A compound synthesized was identified by a method such as NMR analysis. Characteristics of the compound and the composition were measured according to the methods described below.

NMR analysis: DRX-500 made by Bruker BioSpin Corporation was used for measurement. In measurement of $^1$H-NMR, a sample was dissolved in a deuterated solvent such as $CDCl_3$, and measurement was carried out under conditions of room temperature, 500 MHz and 16 times of accumulation. Tetramethylsilane was used as an internal standard. In measurement of $^{19}$F-NMR, measurement was carried out using $CFCl_3$ as an internal standard and under 24 times of accumulation. In explanation of a nuclear magnetic resonance spectrum, s, d, t, q, quin, sex and m stands for a singlet, a doublet, a triplet, a quartet, a quintet, a sextet and a multiplet and br being broad, respectively.

Gas chromatographic analysis: GC-14B Gas Chromatograph made by Shimadzu Corporation was used for measurement. A carrier gas was helium (2 milliliters per minute). A sample injector and a detector (FID) were set to 280° C. and 300° C., respectively. Capillary column DB-1 (length 30 m, bore 0.32 mm, film thickness 0.25 μm, dimethylpolysiloxane as a stationary phase, non-polar) made by Agilent Technologies, Inc. was used for separation of component compounds. After the column was kept at 200° C. for 2 minutes, the column was heated to 280° C. at a rate of 5° C. per minute. A sample was prepared in an acetone solution (0.1% by weight), and then 1 microliter of solution was injected into the sample injector. A recorder was Chromatopac Model C-R5A made by Shimadzu Corporation or the equivalent thereof. The resulting gas chromatogram showed a retention time of a peak and each peak area corresponding to the component compounds.

As a solvent for diluting the sample, chloroform, hexane and so forth may also be used. The following capillary columns may also be used for separating the component compounds: HP-1 (length 30 m, bore 0.32 mm, film thickness 0.25 μm) made by Agilent Technologies, Inc., Rtx-1 (length 30 m, bore 0.32 mm, film thickness 0.25 μm) made by Restek Corporation and BP-1 (length 30 m, bore 0.32 mm, film thickness 0.25 μm) made by SGE International Pty. Ltd. A capillary column CBP1-M50-025 (length 50 m, bore 0.25 mm, film thickness 0.25 μm) made by Shimadzu Corporation may also be used for the purpose of avoiding an overlap of peaks of the compounds.

A ratio of the liquid crystal compounds contained in the composition may be calculated by the method described below. A mixture of liquid crystal compounds is detected by gas chromatograph (FID). A ratio of the peak areas in the gas chromatogram corresponds to a ratio (weight ratio) of the liquid crystal compounds. When the capillary column described above was used, a correction coefficient of each liquid crystal compound may be regarded as 1. Accordingly, the ratio (% by weight) of the liquid crystal compounds can be calculated from the ratio of the peak areas.

Sample for measurement: When characteristics of a composition or a device were measured, the composition was used as a sample as was. When characteristics of a compound were measured, a sample for measurement was prepared by mixing the compound (15% by weight) with a base liquid crystal (85% by weight). Values of characteristics of the compound were calculated using values obtained by measurement, according to an extrapolation method: (Extrapolated value)={(measured value of a sample)−0.85× (measured value of base liquid crystal)}/0.15. When a smectic phase (or crystals) precipitated at 25° C., a ratio of the compound to the base liquid crystal was changed step by step in the order of (10% by weight:90% by weight), (5% by weight:95% by weight) and (1% by weight:99% by weight). Values of maximum temperature, optical anisotropy, viscosity, and dielectric anisotropy with regard to the compound were determined according to the extrapolation method.

The base liquid crystal as described below was used. A ratio of a component compound was expressed in terms of weight percent.

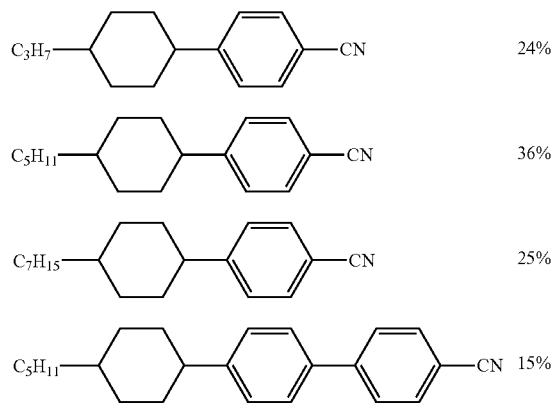

Measuring method: Characteristics were measured according to a method described below. Most of the measuring methods were applied as described in the Standard of the Japan Electronics and Information Technology Industries Association (hereinafter, abbreviated as JEITA) (JEITA EIAJ ED-2521B) discussed and established by JEITA, or modified thereon. No thin film transistor (TFT) was attached to a TN device used for measurement.

(1) Maximum temperature of a nematic phase (NI; ° C.): A sample was put on a hot plate in a melting point apparatus equipped with a polarizing microscope and was heated at a rate of 1° C. per minute. Temperature when part of the sample began to change from a nematic phase to an isotropic liquid was measured.

(2) Minimum temperature of a nematic phase ($T_c$; ° C.): samples each having a nematic phase were put in glass vials and kept in freezers at temperatures of 0° C., −10° C., −20° C., −30° C. and −40° C. for 10 days, and then liquid crystal phases were observed. For example, when a sample maintained the nematic phase at −20° C. and changed to crystals or a smectic phase at −30° C., $T_c$ was expressed as $T_c$<−20° C.

(3) Viscosity (bulk viscosity; q; measured at 20° C.; mPa·s): A cone-plate type (E-type) rotational viscometer made by Tokyo Keiki Inc. was used for measurement.

(4) Viscosity (rotational viscosity; γ1; measured at 25° C.; mPa·s): Measurement was carried out according to the method described in M. Imai et al., Molecular Crystals and Liquid Crystals, Vol. 259, p. 37 (1995). A sample was put in a TN device in which a twist angle was 0 degrees and a gap (cell gap) between two glass substrates was 5 micrometers. Voltage was applied stepwise to the device in the range of 16 V to 19.5 V at an increment of 0.5 V. After a period of 0.2 second with no voltage, voltage was applied repeatedly under the conditions of only one rectangular wave (rectangular pulse; 0.2 second) and no voltage application (2 seconds). A peak current and a peak time of a transient current generated by the applied voltage were measured. A value of rotational viscosity was obtained from the measured values and a calculation equation (8) described on page 40 of the paper presented by M. Imai et al. A value of dielectric anisotropy necessary for the calculation was obtained by the method indicated below using the device that was used for measuring the rotational viscosity.

(5) Optical anisotropy (refractive index anisotropy; Δn; measured at 25° C.): Measurement was carried out by an Abbe refractometer with a polarizing plate on an ocular, using light at a wavelength of 589 nanometers. A surface of a main prism was rubbed in one direction, and then a sample was added dropwise on the main prism. A refractive index (n∥) was measured when the direction of polarized light was parallel to the direction of rubbing. A refractive index (n⊥) was measured when the direction of polarized light was perpendicular to the direction of rubbing. A value of optical anisotropy was calculated from an equation: Δn=n∥−n⊥.

(6) Dielectric anisotropy (ΔE; measured at 25° C.): A sample was put into a TN device in which a distance (cell gap) between two glass substrates was 9 micrometers and a twist angle was 80 degrees. Sine waves (10 V, 1 kHz) were applied to the device, and after 2 seconds, a dielectric constant (∈∥) in the major axis direction of the liquid crystal molecules was measured. Sine waves (0.5 V, 1 kHz) were applied to the device, and after 2 seconds, a dielectric constant (∈⊥) in the minor axis direction of the liquid crystal molecules was measured. A value of dielectric anisotropy was calculated from an equation: Δ∈=∈∥−∈⊥.

(7) Threshold voltage (Vth; measured at 25° C.; V): An LCD 5100 luminance meter made by Otsuka Electronics Co., Ltd. was used for measurement. A light source was a halogen lamp. A sample was put in a normally white mode TN device in which a distance (cell gap) between two glass substrates was 0.45/Δn (μm) and a twist angle was 80 degrees. A voltage (32 Hz, rectangular wave) to be applied to the device was increased stepwise from 0 V to 10 V at an increment of 0.02 V. In the above case, the device was irradiated with light from a direction perpendicular to the device, and an amount of light transmitted through the device was measured. A voltage-transmittance curve was prepared, in which the maximum amount of light corresponds to 100% transmittance and the minimum amount of light corresponds to 0% transmittance. A threshold voltage is a voltage at 90% transmittance.

(8) Voltage holding ratio (VHR-1; measured at 25° C.; %): A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was determined. Area B was an area without decay. A voltage holding ratio was expressed as a percentage of area A to area B.

(9) Voltage holding ratio (VHR-2; measured at 80° C.; %): A voltage holding ratio was measured in a manner identical with the procedures as described above except that measurement was carried out at 80° C. in place of 25° C. The value obtained was described in terms of VHR-2.

(10) Voltage holding ratio (VHR-3; measured at 25° C.; %): Stability to ultraviolet light was evaluated by measuring a voltage holding ratio after a device was irradiated with ultraviolet light. A TN device used for measurement had a polyimide alignment film, and a cell gap was 5 micrometers. A sample was injected into the device, and then the device was irradiated with light for 20 minutes. A light source was ultra-high pressure mercury lamp USH-500D (made by Ushio, Inc.), and a distance between the device and the light source was 20 centimeters. In measuring VHR-3, a decaying voltage was measured for 16.7 milliseconds. A composition having a large VHR-3 has a large stability to ultraviolet light. A value of VHR-3 is preferably 90% or more, further preferably, 95% or more.

(11) Voltage holding ratio (VHR-4; measured at 25° C.; %): A TN device into which a sample was injected was heated in a constant temperature bath at 80° C. for 500 hours, and then stability to heat was evaluated by measuring a voltage holding ratio. In measuring VHR-4, a decaying voltage was measured for 16.7 milliseconds. A composition having a large VHR-4 has a large stability to heat.

(12) Response time (τ; measured at 25° C.; ms): An LCD5100 luminance meter made by Otsuka Electronics Co., Ltd. was used for measurement. A light source was a halogen lamp. A low-pass filter was set at 5 kHz. A sample was put into a normally white mode TN device in which a distance (cell gap) between two glass substrates was 5.0 micrometers and a twist angle was 80 degrees. Rectangular waves (60 Hz, 5 V, 0.5 seconds) were applied to the device. On the occasion, the device was irradiated with light from a direction perpendicular to the device, and an amount of light transmitted through the device was measured. The maximum amount of light corresponds to 100% transmittance, and the minimum amount of light corresponds to 0% transmittance. A rise time (τr: ms) is a period of time needed for a change from 90% transmittance to 10% transmittance. A fall time (τf: fall time; ms) is a period of time needed for a change from transmittance 10% to 90% transmittance. A response time is a sum of the rise time and the fall time thus obtained.

(13) Elastic constant (K; measured at 25° C.; pN): HP4284A LCR Meter by Yokogawa-Hewlett-Packard Co. was used for measurement. A sample was put into a horizontal alignment device in which a distance (cell gap) between two glass substrates was 20 micrometers. Voltage from 0 V to 20 V was applied to the device, and electrostatic capacity and the applied voltage were measured. Measured values of the capacitance (C) and the applied voltage (V) were fitted to equation (2.98) and equation (2.101) on page 75 of "Liquid Crystal Device Handbook (Ekisho Debaisu Handobukku in Japanese)" (Nikkan Kogyo Shimbun, Ltd.), and values of K11 and K33 were obtained from equation (2.99). Next, K22 was calculated using the value of K11 and K33 in equation (3.18) on page 171 of the same handbook. An elastic constant is a mean value of the thus determined K11, K22 and K33.

(14) Specific resistance (ρ; measured at 25° C.; Ωcm): Into a vessel equipped with electrodes, 1.0 milliliter of a sample was injected. A DC voltage (10 V) was applied to the vessel, and a DC current after 10 seconds was measured. A specific resistance was calculated from the following equation: (specific resistance)={(voltage)×(electric capacity of a vessel)}/{(direct current)×(dielectric constant of vacuum)}.

(15) Helical pitch (P; measured at room temperature; μm): A helical pitch was measured according to a wedge method. Refer to "Handbook of Liquid Crystals (Ekisho Binran in Japanese)," page 196, (issued in 2000, Maruzen Co., Ltd.). A sample was injected into a wedge cell and left to stand at room temperature for 2 hours, and then a gap (d2−d1) between disclination lines was observed by a polarizing microscope (trade name: MM40/60 series, Nikon Corporation). A helical pitch (P) was calculated according to the following equation in which an angle of the wedge cell was expressed as θ: P=2×(d2−d1)×tan θ.

(16) Dielectric constant in a minor axis direction (∈⊥; measured at 25° C.): A sample was put into a TN device in which a distance (cell gap) between two glass substrates is 9 micrometers and a twist angle is 80 degrees. Sine waves (0.5 V, 1 kHz) were applied to the device, and a dielectric constant (∈⊥) in a minor axis direction of the liquid crystal molecules was measured after 2 seconds.

(17) DC brightness relaxation time constant ($\tau_{DC}$; measured at 50° C.; %/s): Although a method of measuring the time constant is described in Patent literature No. 1, a simplified method was applied here. Multimedia Display Tester 3298F by Yokogawa Electric Corporation was used for measurement. A light source was a halogen lamp. First, a sample was put into an FFS device in which a distance (cell gap) between two glass substrates was 3.2 micrometers. A DC voltage from 0 V to 10 V was applied to the device, and a voltage ($V_{21.1}$) at which an amount of light transmitted through the device became 21.1% being the maximum (127 gradations) was measured. Next, a voltage obtained by adding an offset voltage (DC1V) to the voltage above was applied to the device, and an amount of light transmitted through the device was measured for 300 seconds until the amount of light became constant. The results were plotted and a DC brightness relaxation time constant was determined from an inclination of a straight line from 0 seconds to 60 seconds. As the value is negatively larger, discharge of electric charge accumulated in a picture element is faster, and therefore image persistence reduces.

Compounds in Examples and Comparative Examples were described using symbols according to definitions in Table 3 below. In Table 3, a configuration of 1,4-cyclohexylene is trans. Parenthesized number next to a symbolized compound corresponds to the number of the compound. A symbol (-) means any other liquid crystal compound. A ratio (percentage) of the liquid crystal compound is expressed in terms of weight percent (% by weight) based on the weight of the liquid crystal composition. Values of characteristics of the composition were summarized in the last part.

TABLE 3

Method for Description of Compounds using Symbols
$R-(A_1)-Z_1---Z_n-(A_n)-R'$

| 1) Left-terminal Group R— | Symbol |
|---|---|
| $C_nH_{2n+1}-$ | n— |
| $C_nH_{2n+1}O-$ | nO— |
| $C_mH_{2m+1}OC_nH_{2n}-$ | mOn— |
| $CH_2=CH-$ | V— |
| $C_nH_{2n+1}-CH=CH-$ | nV— |
| $CH_2=CH-C_nH_{2n}-$ | Vn— |
| $C_mH_{2m+1}-CH=CH-C_nH_{2n}-$ | mVn— |
| $CF_2=CH-$ | VFF— |
| $CF_2=CH-C_nH_{2n}-$ | VFFn— |
| $F-C_nH_{2n}-$ | Fn— |

| 2) Right-terminal Group —R' | Symbol |
|---|---|
| $-C_nH_{2n+1}$ | —n |
| $-OC_nH_{2n+1}$ | —On |
| $-CH=CH_2$ | —V |
| $-CH=CH-C_nH_{2n+1}$ | —Vn |
| $-C_nH_{2n}-CH=CH_2$ | —nV |
| $-C_nH_{2n}-CH=CH-C_mH_{2m+1}$ | —nVm |
| $-CH=CF_2$ | —VFF |
| $-COOCH_3$ | —EMe |
| $-F$ | —F |
| $-Cl$ | —CL |
| $-OCF_3$ | —OCF3 |
| $-CF_3$ | —CF3 |
| $-CN$ | —C |

| 3) Bonding Group —Zn— | Symbol |
|---|---|
| $-C_2H_4-$ | 2 |
| $-COO-$ | E |
| $-CH=CH-$ | V |
| $-C\equiv O-$ | T |
| $-CF_2O-$ | X |
| $-CH_2O-$ | 1O |

| 4) Ring Structure —$A_n$— | Symbol |
|---|---|
| 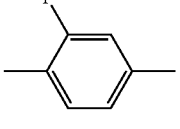 | H |
| 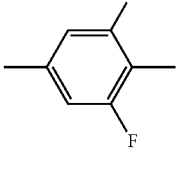 | Dh |
| 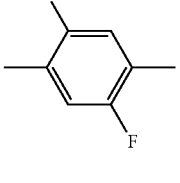 | dh |
| 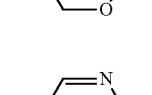 | B |
| 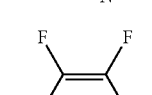 | B(F) |

TABLE 3-continued

Method for Description of Compounds using Symbols
$R-(A_1)-Z_1---Z_n-(A_n)-R'$

| | Symbol |
|---|---|
| 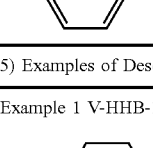 | B(2F) |

(remaining structures: B(F,F), B(2F,5F), G, Py, B(2F,3F))

5) Examples of Description

Example 1 V-HHB-1

Example 2 3-BB(F)B(F,F)—F

Example 3 4-BB(F)B(F,F)XB(F,F)—F

Example 4  5-GB(F,F)XB(F,F)—F

[Chemical structure: C5H11 on 1,3-dioxane ring connected to difluorobenzene-CF2O-tetrafluorobenzene-F]

Example 1

| | | |
|---|---|---|
| 3-HHXB(F,F)-F | (2-4) | 10% |
| 3-HHXB(F,F)-CF3 | (2-5) | 3% |
| 2-HHBB(F,F)-F | (2-19) | 4% |
| 3-HHBB(F,F)-F | (2-19) | 5% |
| 4-HHBB(F,F)-F | (2-19) | 4% |
| 5-HHBB(F,F)-F | (2-19) | 4% |
| 4-GB(F)B(F,F)XB(F,F)-F | (2-27) | 7% |
| 3-BB(F)B(F,F)XB(F)-F | (2-28) | 4% |
| 3-BB(F)B(F,F)XB(F,F)-F | (2-29) | 3% |
| 4-BB(F)B(F,F)XB(F,F)-F | (2-29) | 8% |
| 5-BB(F)B(F,F)XB(F,F)-F | (2-29) | 6% |
| 3-HH-V | (3-1) | 30% |
| 4-HH-V1 | (3-1) | 5% |
| 7-HB-1 | (3-2) | 3% |
| 3-HHB-O1 | (3-5) | 4% |

NI=107.1° C.; Tc<-20° C.; Δn=0.113; Δ∈=11.2; Vth=1.45 V; η=16.8 mPa·s; γ1=102.9 mPa·s. To the composition, compound (1-1) was added in a ratio of 0.1% by weight, and a DC brightness relaxation time constant was measured. $\tau_{DC}$=-0.051%/s.

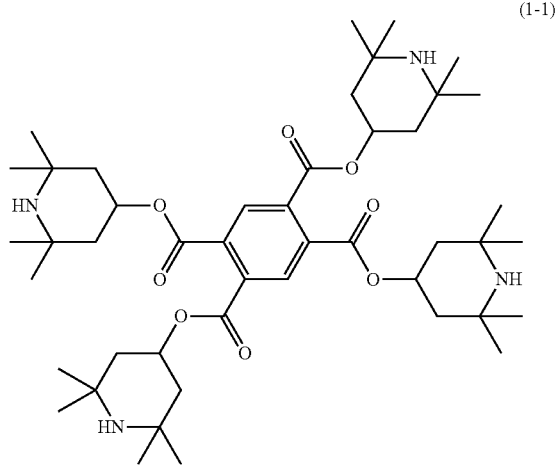

(1-1)

Comparative Example 1

A DC brightness relaxation time constant was measured on a composition before compound (1-1) in Example 1 was added. $\tau_{DC}$=-0.024%/s.

Example 2

| | | |
|---|---|---|
| 4-GHB(F,F)-F | (2-7) | 5% |
| 3-GB(F)B(F)-F | (2-11) | 5% |
| 3-GB(F,F)XB(F)-F | (2-13) | 4% |
| 2-HHBB(F,F)-F | (2-19) | 4% |
| 3-HHBB(F,F)-F | (2-19) | 6% |
| 4-HHBB(F,F)-F | (2-19) | 5% |
| 4-GB(F)B(F,F)XB(F,F)-F | (2-27) | 7% |
| 4-BB(F)B(F,F)XB(F,F)-F | (2-29) | 9% |
| 5-BB(F)B(F,F)XB(F,F)-F | (2-29) | 7% |
| 3-HHB-CL | (2) | 3% |
| 3-HH-V | (3-1) | 29% |
| 3-HH-VFF | (3-1) | 4% |
| 3-HB-O2 | (3-2) | 3% |
| 3-HHB-3 | (3-5) | 3% |
| 5-HBB-2 | (3-6) | 3% |
| 3-HBBH-1O1 | (—) | 3% |

NI=104.1° C.; Tc<-20° C.; Δn=0.114; Δ∈=10.9; Vth=1.55 V; η=16.9 mPa·s; γ1=112.1 mPa·s; VHR-1=99.2%; VHR-2=98.2%; VHR-3=98.1%. To the composition, compound (1-1) was added in a ratio of 0.1% by weight, and a DC brightness relaxation time constant was measured. $\tau_{DC}$=-0.061%/s.

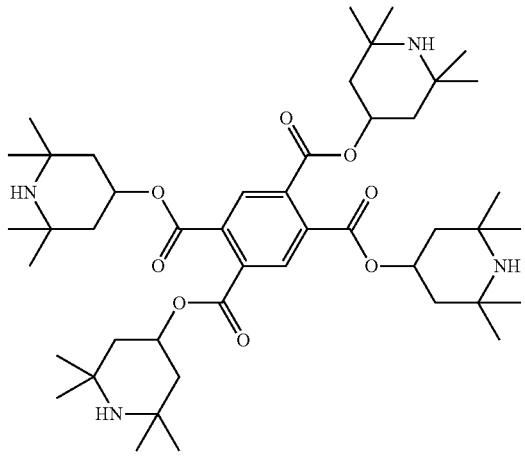

(1-1)

Example 3

| | | |
|---|---|---|
| 3-HHXB(F,F)-F | (2-4) | 11% |
| 3-HGB(F,F)-F | (2-6) | 3% |
| 4-GHB(F,F)-F | (2-7) | 10% |
| 3-BB(F,F)XB(F,F)-F | (2-18) | 9% |
| 2-HHEB(F,F)-F | (2-19) | 4% |
| 3-HHBB(F,F)-F | (2-19) | 5% |
| 4-BB(F)B(F,F)XB(F,F)-F | (2-29) | 9% |
| 5-BB(F)B(F,F)XB(F,F)-F | (2-29) | 3% |
| 3-HB(2F,3F)BXB(F,F)-F | (2-34) | 10% |
| 3-HH-V | (3-1) | 20% |
| 1-BB-5 | (3-3) | 5% |
| 3-HHB-1 | (3-5) | 8% |
| 3-HBB-2 | (3-6) | 3% |

NI=94.9° C.; Tc<-20° C.; Δn=0.113; Δ∈=12.1; Vth=1.44 V; η=18.1 mPa·s; γ1=113.4 mPa·s. To the composition, compound (1-2) was added in a ratio of 0.08% by weight, and a DC brightness relaxation time constant was measured. $\tau_{DC}=-0.053\%/s$.

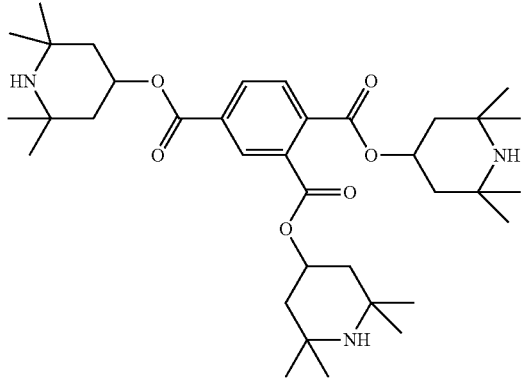

(1-2)

Example 4

| | | |
|---|---|---|
| 3-HHB(F,F)-F | (2-2) | 3% |
| 3-HHXB(F,F)-F | (2-4) | 13% |
| 3-HB(F)B(F,F)-F | (2-9) | 5% |
| 3-BB(F)B(F,F)-F | (2-15) | 13% |
| 3-HHBB(F,F)-F | (2-19) | 3% |
| 4-GBB(F)B(F,F)-F | (2-22) | 3% |
| 3-HBBXB(F,F)-F | (2-23) | 8% |
| 3-HBB(F,F)XB(F,F)-F | (2-24) | 6% |
| 3-BB(2F,3F)BXB(F,F)-F | (2-35) | 3% |
| 3-HH-V | (3-1) | 24% |
| 3-HH-V1 | (3-1) | 7% |
| V2-BB-1 | (3-3) | 3% |
| 3-HHEH-3 | (3-4) | 3% |
| 1-BB(F)B-2V | (3-7) | 3% |
| 5-HBB(F)B-2 | (3-13) | 3% |

NI=93.7° C.; Tc<−20° C.; Δn=0.121; Δ∈=7.5; Vth=1.59 V; η=18.5 mPa·s; γ1=97.6 mPa·s. To the composition, compound (1-1) was added in a ratio of 0.07% by weight, and a DC brightness relaxation time constant was measured. $\tau_{DC}=-0.052\%/s$.

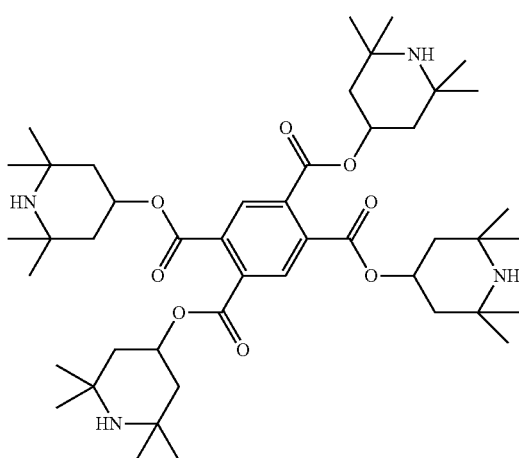

(1-1)

Example 5

| | | |
|---|---|---|
| 5-HXB(F,F)-F | (2-1) | 5% |
| 3-HHB(F,F)-F | (2-2) | 10% |
| 3-HHEB(F,F)-F | (2-3) | 9% |
| 3-HHXB(F,F)-F | (2-4) | 13% |
| 2-HBEB(F,F)-F | (2-10) | 3% |
| 3-HBEB(F,F)-F | (2-10) | 3% |
| 3-BBXB(F,F)-F | (2-17) | 3% |
| 3-BB(F,F)XB(F,F)-F | (2-18) | 7% |
| 3-dhBB(F,F)XB(F,F)-F | (2-25) | 4% |
| 3-BB(F)B(F,F)XB(F)B(F,F)-F | (2-31) | 3% |
| 3-HB-CL | (2) | 6% |
| 3-HH-V | (3-1) | 7% |
| 3-HH-V1 | (3-1) | 10% |
| 5-HH-V | (3-1) | 7% |
| 3-HHEBH-3 | (3-10) | 4% |
| 3-BB(2F,3F)-O2 | (4-5) | 3% |
| 3-dhBB(2F,3F)-O2 | (4-16) | 3% |

NI=77.8° C.; Tc<−20° C.; Δn=0.090; Δ∈=9.1; Vth=1.19 V; η=17.8 mPa·s; γ1=86.2 mPa·s. To the composition, compound (1-2) was added in a ratio of 0.1% by weight, and a DC brightness relaxation time constant was measured. $\tau_{DC}=-0.053\%/s$.

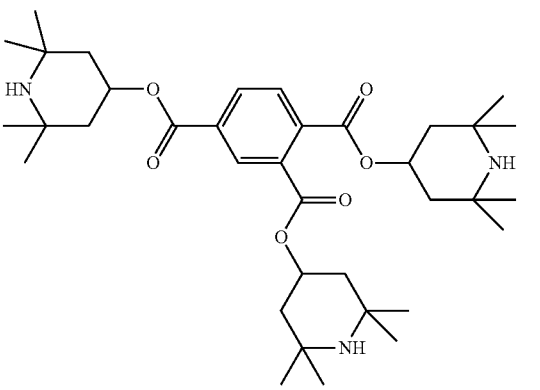

(1-2)

Example 6

| | | |
|---|---|---|
| 3-GB(F,F)XB(F,F)-F | (2-14) | 4% |
| 3-BB(F)B(F,F)-CF3 | (2-16) | 3% |
| 3-BB(F,F)XB(F,F)-F | (2-18) | 16% |
| 3-HHB(F)B(F,F)-F | (2-20) | 4% |
| 3-HBBXB(F,F)-F | (2-23) | 10% |
| 4-GB(F)B(F,F)XB(F,F)-F | (2-27) | 4% |
| 5-GB(F)B(F,F)XB(F,F)-F | (2-27) | 4% |
| 4-BB(F)B(F,F)XB(F,F)-F | (2-29) | 4% |
| 3-B(2F,3F)BXB(F,F)-F | (2-33) | 3% |
| 3-HH-V | (3-1) | 25% |
| 3-HH-O1 | (3-1) | 3% |
| 1-BB-3 | (3-3) | 3% |
| V-HHB-1 | (3-5) | 5% |
| 2-BB(F)B-3 | (3-7) | 3% |
| 5-B(F)BB-2 | (3-8) | 3% |
| V-HHB(2F,3F)-O2 | (4-7) | 3% |
| 3-HBB(2F,3F)-O2 | (4-15) | 3% |

NI=71.2° C.; Tc<−20° C.; Δn=0.120; Δ∈=11.9; Vth=1.24 V; η=18.2 mPa·s; γ1=89.8 mPa·s. To the composition, compound (1-1) was added in a ratio of 0.12% by weight, and a DC brightness relaxation time constant was measured. $\tau_{DC}=-0.070\%/s$.

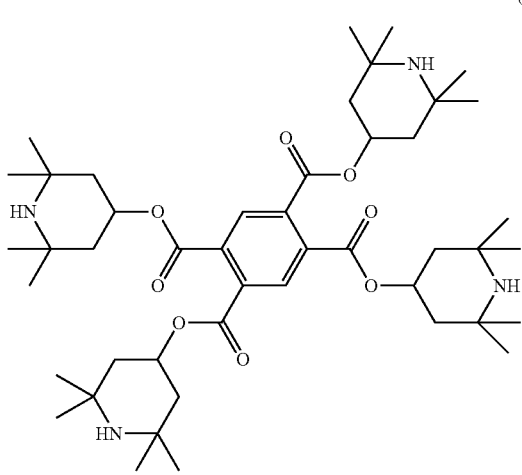

Example 7

| | | |
|---|---|---|
| 3-HBB(F,F)-F | (2-8) | 4% |
| 3-GB(F)B(F,F)-F | (2-12) | 3% |
| 3-BB(F)B(F,F)-F | (2-15) | 6% |
| 3-BB(F,F)XB(F,F)-F | (2-18) | 18% |
| 3-HBBXB(F,F)-F | (2-23) | 3% |
| 3-BB(F)B(F,F)XB(F,F)-F | (2-29) | 3% |
| 4-BB(F)B(F,F)XB(F,F)-F | (2-29) | 7% |
| 4-BB(F,F)XB(F)B(F,F)-F | (2-30) | 3% |
| 3-HH-V | (3-1) | 29% |
| V-HHB-1 | (3-5) | 11% |
| 2-BB(F)B-2V | (3-7) | 4% |
| 3-HB(F)HH-5 | (3-9) | 3% |
| 5-HBBH-3 | (3-11) | 3% |
| 3-HB(F)BH-3 | (3-12) | 3% |

NI=80.6° C.; Tc<-30° C.; Δn=0.124; Δ∈=9.9; Vth=1.54 V; η=20.6 mPa·s; γ1=81.1 mPa·s. To the composition, compound (1-1) was added in a ratio of 0.1% by weight, and a DC brightness relaxation time constant was measured. $\tau_{DC}=-0.060\%/s$.

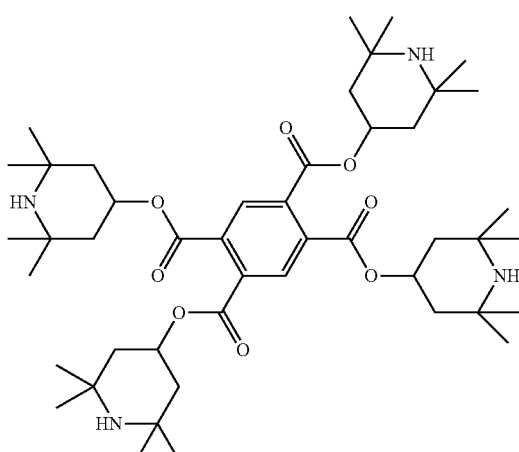

Example 8

| | | |
|---|---|---|
| 3-HHXB(F,F)-F | (2-4) | 10% |
| 4-GHB(F,F)-F | (2-7) | 10% |
| 3-BB(F,F)XB(F,F)-F | (2-18) | 6% |
| 2-HHBB(F,F)-F | (2-19) | 4% |
| 3-HHBB(F,F)-F | (2-19) | 6% |
| 4-HHBB(F,F)-F | (2-19) | 5% |
| 5-HHBB(F,F)-F | (2-19) | 5% |
| 3-GBB(F)B(F,F)-F | (2-22) | 3% |
| 4-GB(F)B(F,F)XB(F)-F | (2-26) | 8% |
| 4-BB(F)B(F,F)XB(F,F)-F | (2-29) | 3% |
| 3-HH-V | (3-1) | 19% |
| 2-HH-3 | (3-1) | 4% |
| 3-HH-4 | (3-1) | 3% |
| V2-BB-1 | (3-3) | 6% |
| 3-HHB-1 | (3-5) | 5% |
| 5-HBB(F)B-3 | (3-13) | 3% |

NI=107.6° C.; Tc<-20° C.; Δn=0.111; Δ∈=10.6; Vth=1.55 V; η=19.4 mPa·s; γ1=121.9 mPa·s. To the composition, compound (1-1) was added in a ratio of 0.1% by weight, and a DC brightness relaxation time constant was measured. $\tau_{DC}=-0.064\%/s$.

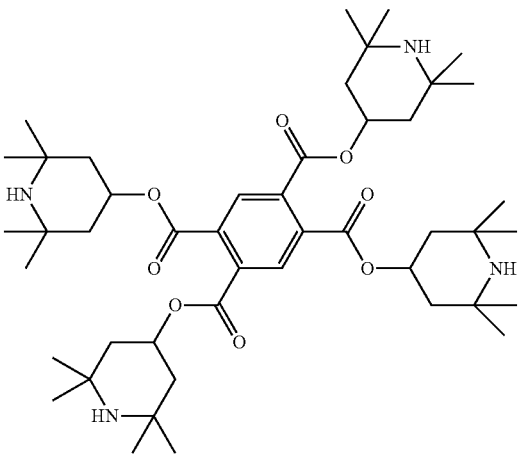

Example 9

| | | |
|---|---|---|
| 3-HHXB(F,F)-CF3 | (2-5) | 12% |
| 3-GB(F,F)XB(F,F)-F | (2-14) | 8% |
| 3-GBB(F)B(F,F)-F | (2-22) | 3% |
| 4-GBB(F)B(F,F)-F | (2-22) | 3% |
| 3-HBBXB(F,F)-F | (2-23) | 3% |
| 4-GB(F)B(F,F)XB(F,F)-F | (2-27) | 5% |
| 5-GB(F)B(F,F)XB(F,F)-F | (2-27) | 5% |
| 4-BB(F)B(F,F)XB(F,F)-F | (2-29) | 7% |
| 5-BB(F)B(F,F)XB(F,F)-F | (2-29) | 5% |
| 3-HH-V | (3-1) | 22% |
| 3-HH-V1 | (3-1) | 10% |
| 3-HH-2V1 | (3-1) | 9% |
| V2-HHB-1 | (3-5) | 8% |

NI=89.7° C.; Tc<-20° C.; Δn=0.102; Δ∈=13.7; Vth=1.35 V; η=20.6 mPa·s; γ1=126.5 mPa·s. To the composition, compound (1-1) was added in a ratio of 0.1% by weight, and a DC brightness relaxation time constant was measured. $\tau_{DC}$=−0.067%/s.

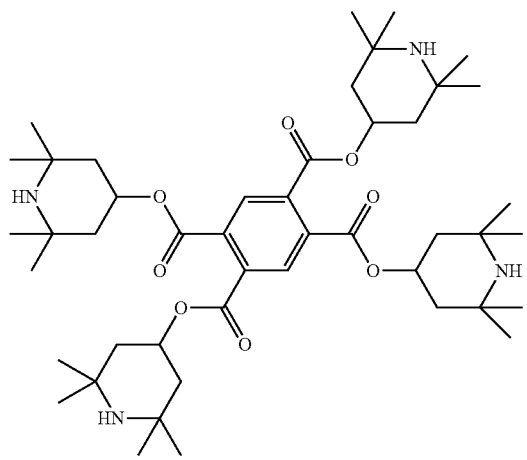

(1-1)

Example 10

| | | |
|---|---|---|
| 3-HHB(F,F)-F | (2-2) | 10% |
| 3-HHXB(F,F)-F | (2-4) | 3% |
| 3-GHB(F,F)-F | (2-7) | 4% |
| 3-BB(F)B(F,F)-F | (2-15) | 7% |
| 3-BB(F,F)XB(F,F)-F | (2-18) | 13% |
| 3-GB(F)B(F)B(F)-F | (2-21) | 6% |
| 4-BB(F)B(F,F)XB(F,F)-F | (2-29) | 10% |
| 3-HH-V | (3-1) | 17% |
| 3-HH-4 | (3-1) | 11% |
| 5-HB-O2 | (3-2) | 3% |
| 3-HHB-1 | (3-5) | 5% |
| 3-HHB-O1 | (3-5) | 6% |
| 3-HHB-3 | (3-5) | 5% |

NI=83.1° C.; Tc<−20° C.; Δn=0.109; Δ∈=9.9; Vth=1.42 V; η=19.6 mPa·s; γ1=114.3 mPa·s. To the composition, compound (1-2) was added in a ratio of 0.08% by weight, and a DC brightness relaxation time constant was measured. $\tau_{DC}$=−0.052%/s.

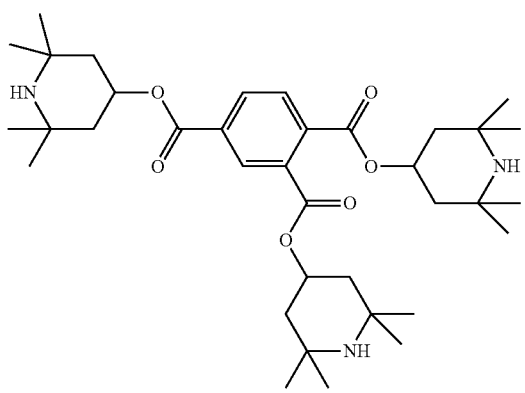

(1-2)

Example 11

| | | |
|---|---|---|
| 3-BB(F,F)XB(F,F)-F | (2-18) | 5% |
| 2-HHBB(F,F)-F | (2-19) | 2% |
| 3-HHBB(F,F)-F | (2-19) | 3% |
| 4-HHBB(F,F)-F | (2-19) | 4% |
| 4-BB(F)B(F,F)XB(F,F)-F | (2-29) | 4% |
| 5-BB(F)B(F,F)XB(F,F)-F | (2-29) | 2% |
| 3-BB(2F,3F)XB(F,F)-F | (2-32) | 5% |
| 3-HB-CL | (2) | 6% |
| 3-HHB-CL | (2) | 6% |
| 5-HHB-CL | (2) | 5% |
| 3-HH-V1 | (3-1) | 10% |
| 4-HH-V | (3-1) | 13% |
| 5-HH-V | (3-1) | 10% |
| V-HHB-1 | (3-5) | 13% |
| 2-BB(F)B-3 | (3-7) | 5% |
| 2-BB(F)B-5 | (3-7) | 4% |
| 5-HBB(F)B-2 | (3-13) | 3% |

NI=102.2° C.; Tc<−20° C.; Δn=0.117; Δ∈=4.5; Vth=2.19 V; η=17.8 mPa·s; γ1=85.4 mPa·s. To the composition, compound (1-1) was added in a ratio of 0.1% by weight, and a DC brightness relaxation time constant was measured. $\tau_{DC}$=−0.056%/s.

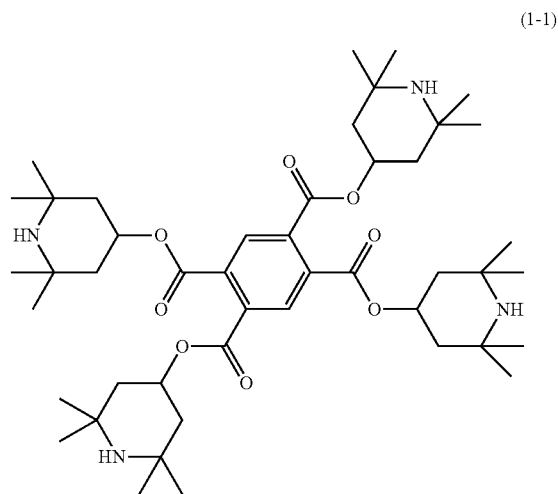

(1-1)

The DC brightness relaxation time constant in Comparative Example 1 was −0.024%/s. On the other hand, the DC brightness relaxation time constants in Example 1 to Example 11 each were in the range from −0.051%/s to −0.070%/s. Thus, the compositions in Examples each have a negatively larger DC brightness relaxation time constant in comparison with the composition in Comparative Example. Accordingly, the liquid crystal composition according to the invention is concluded to have further excellent characteristics.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

INDUSTRIAL APPLICABILITY

A liquid crystal composition of the invention satisfies at least one of characteristics such as a high maximum temperature, a low minimum temperature, a small viscosity, a suitable optical anisotropy, a large dielectric anisotropy, a large specific resistance, a large elastic constant, a high stability to ultraviolet light and a high stability to heat, or has a suitable balance regarding at least two of the characteristics. A liquid crystal display device including the composition has a short response time, a large voltage holding ratio, a large contrast ratio, a large DC brightness relaxation time constant, a long service life and so forth, and thus can be used for a liquid crystal projector, a liquid crystal television and so forth.

What is claimed is:

1. A liquid crystal composition that has a positive dielectric anisotropy and a nematic phase, and contains at least one compound selected from the group of compounds represented by formula (1) as an additive component and at least one compound from the group of compounds represented by formula (2) as a first component:

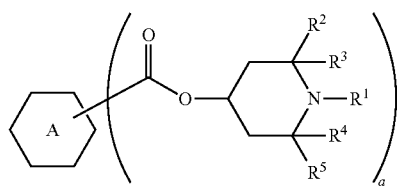

(1)

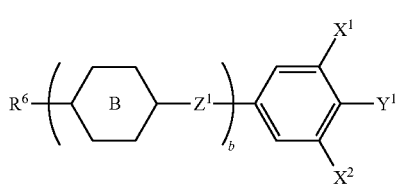

(2)

wherein, in formula (1), $R^1$ is hydrogen or alkyl having 1 to 15 carbons; $R^2$, $R^3$, $R^4$ and $R^5$ are independently hydrogen or alkyl having 1 to 4 carbons; ring A is a polyvalent group derived from benzene or cyclohexane by eliminating hydrogen; a is 3 or 4; and in formula (2), $R^6$ is alkyl having 1 to 12 carbons, alkoxy having to 12 carbons or alkenyl having 2 to 12 carbons; ring B is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; $Z^1$ is a single bond, ethylene, carbonyloxy or difluoromethyleneoxy; $X^1$ and $X^2$ are independently hydrogen or fluorine; $Y^1$ is fluorine, chlorine, alkyl having 1 to 12 carbons in which at least one of hydrogen is replaced by fluorine or chlorine, alkoxy having 1 to 12 carbons in which at least one of hydrogen is replaced by fluorine or chlorine, or alkenyloxy having 2 to 12 carbons in which at least one of hydrogen is replaced by fluorine or chlorine; and b is 1, 2, 3 or 4.

2. The liquid crystal composition according to claim 1, containing a compound represented by formula (1-1) or formula (1-2) as the additive component:

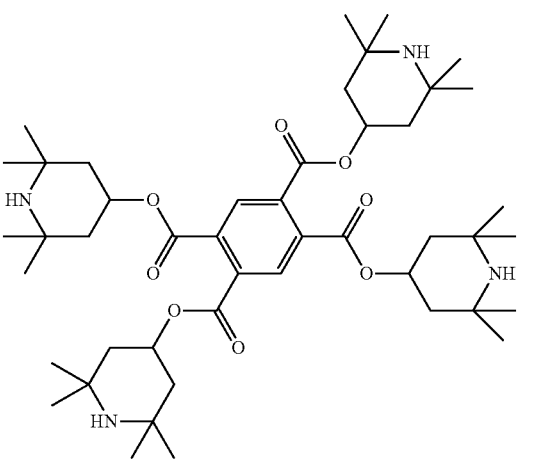

(1-1)

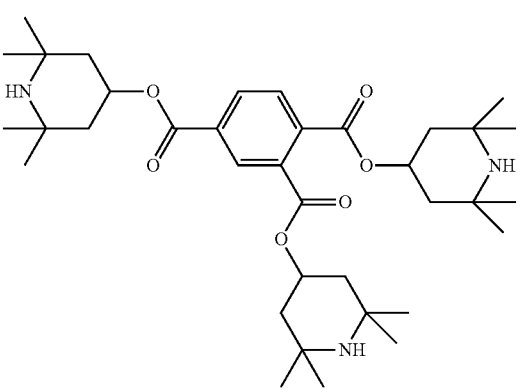

(1-2)

3. The liquid crystal composition according to claim 1, wherein a ratio of the additive component is in the range of 0.005% by weight to 1% by weight based on the weight of the liquid crystal composition.

4. The liquid crystal composition according to claim 1, containing at least one compound selected from the group of compounds represented by formula (2-1) to (2-35) as the first component:

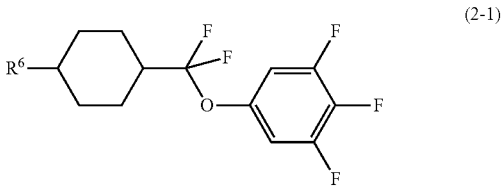

(2-1)

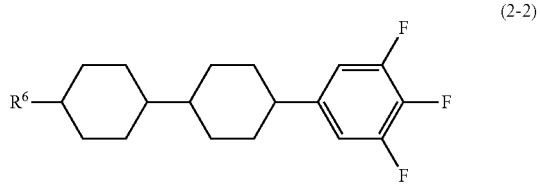

(2-2)

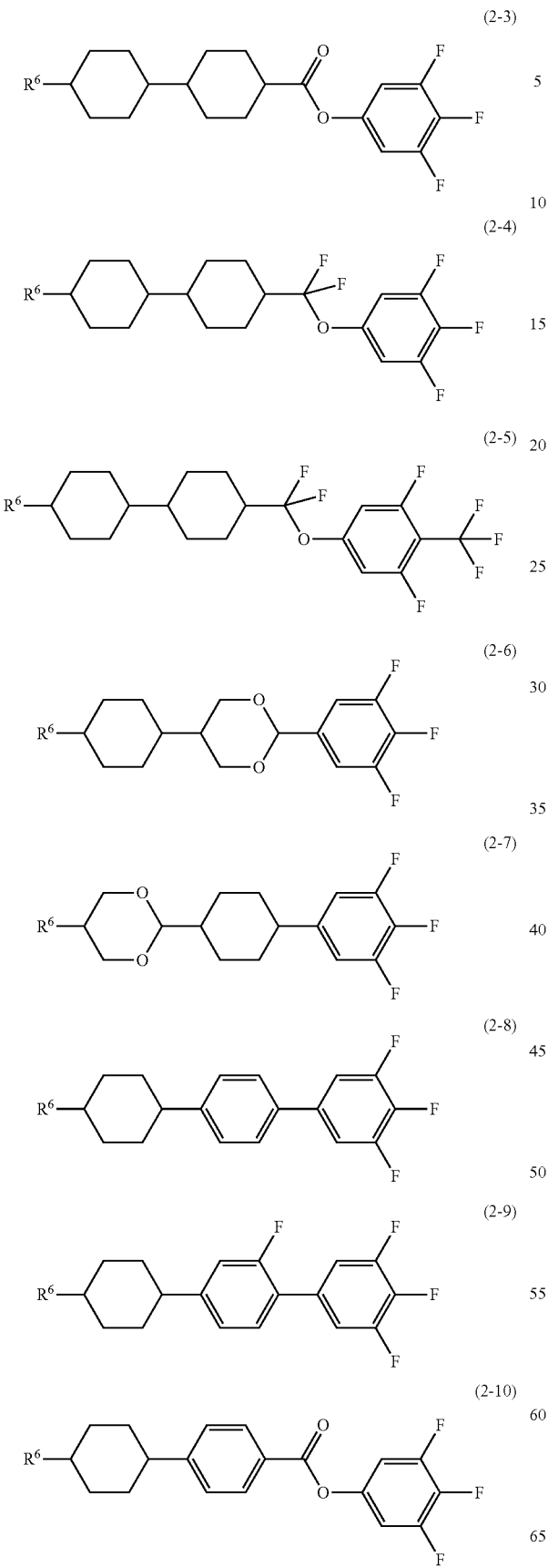

(2-19) 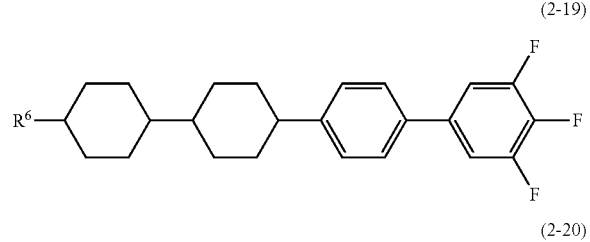
(2-20) 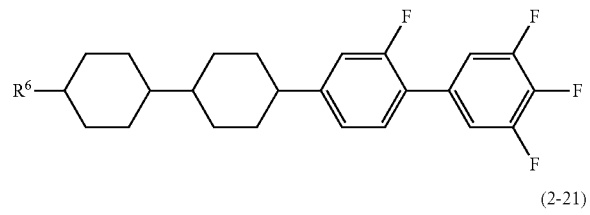
(2-21) 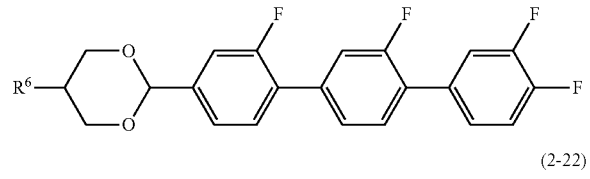
(2-22) 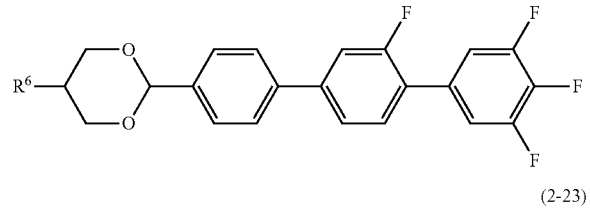
(2-23) 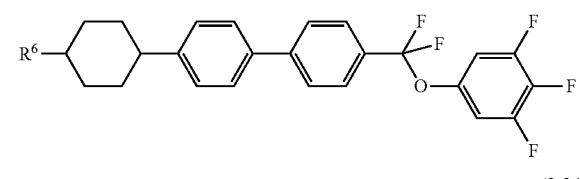
(2-24) 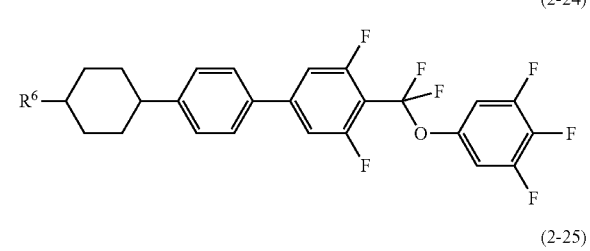
(2-25) 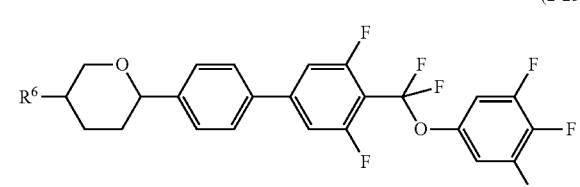
(2-26) 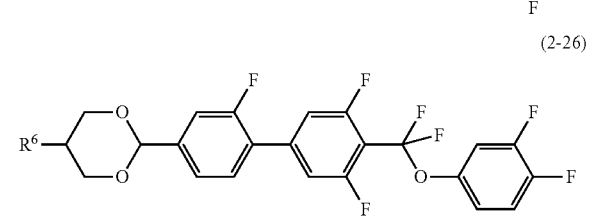
(2-27) 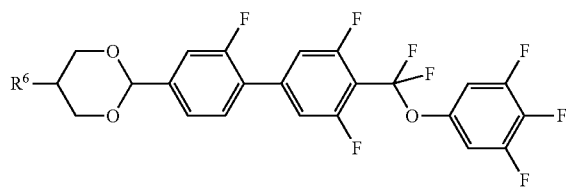
(2-28) 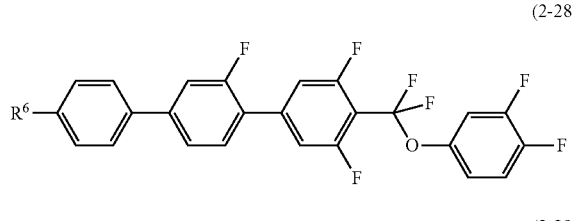
(2-29) 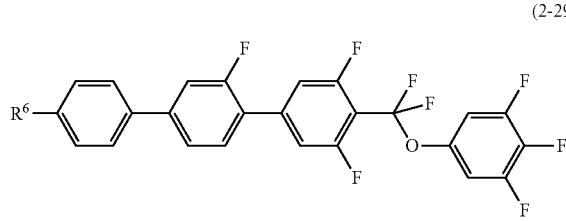
(2-30) 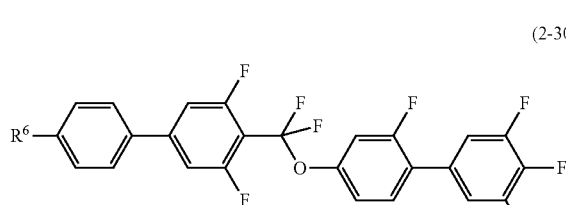
(2-31) 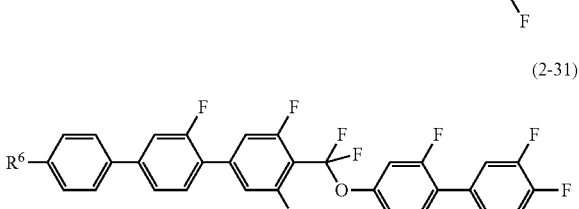
(2-32) 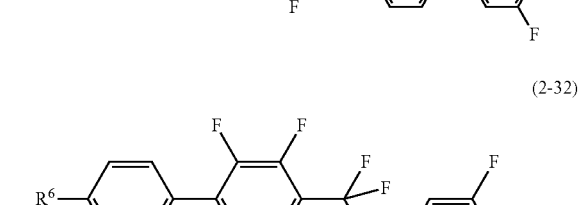
(2-33) 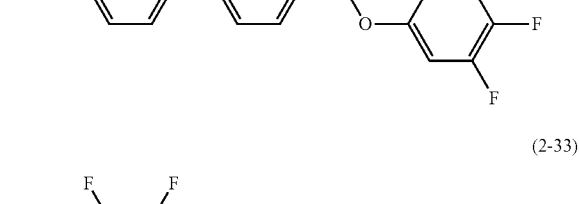
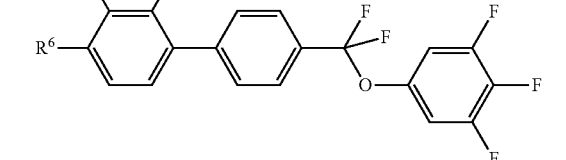

(2-34)

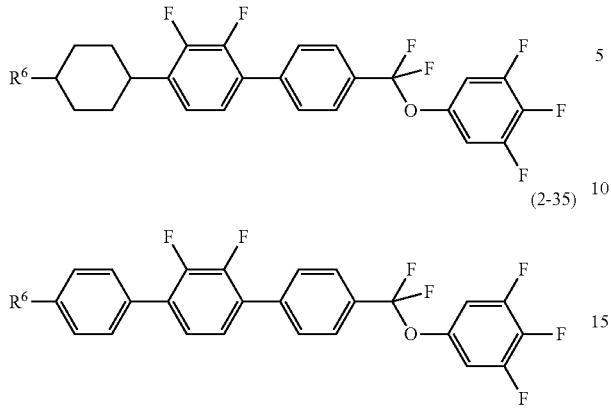

(2-35)

wherein, in formula (2-1) to (2-35), $R^6$ is alkyl having 1 to 12 carbons, alkoxy having 1 to 12 carbons or alkenyl having 2 to 12 carbons.

5. The liquid crystal composition according to claim 1, wherein a ratio of the first component is in the range of 10% by weight to 90% by weight based on the weight of the liquid crystal composition.

6. The liquid crystal composition according to claim 1, containing at least one compound selected from the group of compounds represented by formula (3) as a second component:

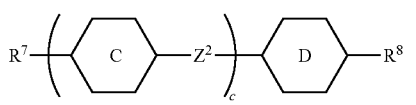

(3)

wherein, in formula (3), $R^7$ and $R^8$ are independently alkyl having 1 to 12 carbons, alkoxy having 1 to 12 carbons, alkenyl having 2 to 12 carbons, alkyl having 1 to 12 carbons in which at least one of hydrogen is replaced by fluorine or chlorine, or alkenyl having 2 to 12 carbons in which at least one of hydrogen is the replaced by fluorine or chlorine; ring C and ring D are independently 1,4-cyclohexylene, 1,4-phenylene, 2-fluoro-1,4-phenylene or 2,5-difluoro-1,4-phenylene; $Z^2$ is a single bond, ethylene or carbonyloxy; and c is 1, 2 or 3.

7. The liquid crystal composition according to claim 6, containing at least one compound selected from the group of compounds represented by formula (3-1) to (3-13) as the second component:

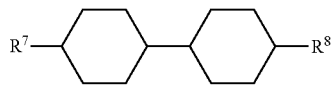
(3-1)

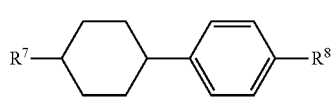
(3-2)

(3-3)

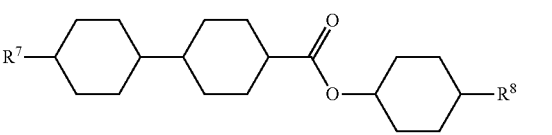
(3-4)

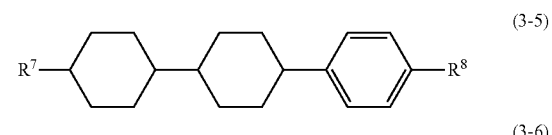
(3-5)

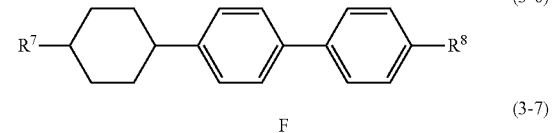
(3-6)

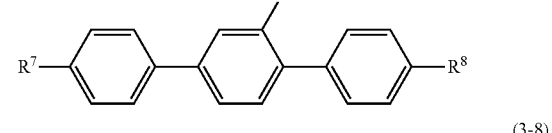
(3-7)

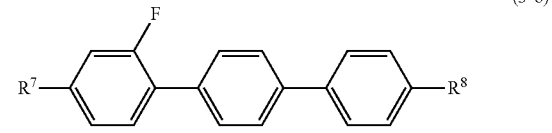
(3-8)

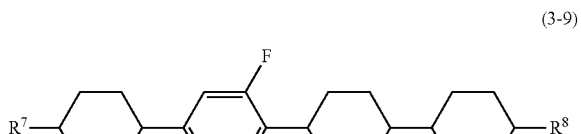
(3-9)

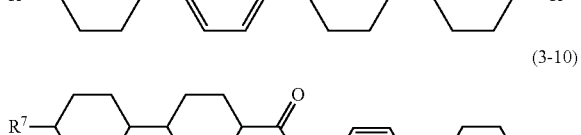
(3-10)

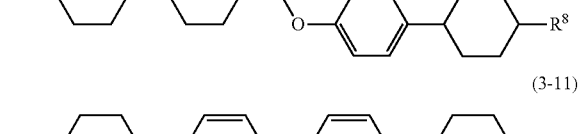
(3-11)

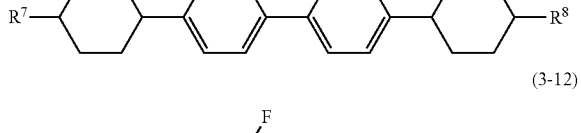
(3-12)

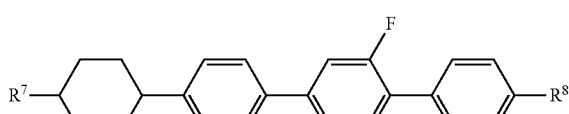
(3-13)

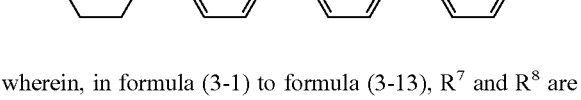

wherein, in formula (3-1) to formula (3-13), $R^7$ and $R^8$ are independently alkyl having 1 to 12 carbons, alkoxy having 1 to 12 carbons, alkenyl having 2 to 12 carbons, alkyl having 1 to 12 carbons in which at least one of hydrogen is replaced by fluorine or chlorine, or alkenyl having 2 to 12 carbons in which at least one of hydrogen is replaced by fluorine or chlorine.

8. The liquid crystal composition according to claim 6, wherein a ratio of the second component is in the range of 10% by weight to 90% by weight based on the weight of the liquid crystal composition.

9. The liquid crystal composition according to claim 1, containing at least one compound selected from the group of compounds represented by formula (4) as a third component:

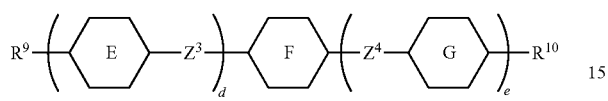
(4)

wherein, in formula (4), $R^9$ and $R^{10}$ are independently alkyl having 1 to 12 carbons, alkoxy having 1 to 12 carbons, alkenyl having 2 to 12 carbons, or alkyl having 1 to 12 carbons in which at least one of hydrogen is replaced by fluorine or chlorine; ring E and ring G are independently 1,4-cyclohexylene, 1,4-cyclohexenylene, 1,4-phenylene, 1,4-phenylene in which at least one of hydrogen is replaced by fluorine or chlorine, or tetrahydropyran-2,5-diyl; ring F is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, ethylene, carbonyloxy or methyleneoxy; d is 1, 2 or 3, and e is 0 or 1; and a sum of d and e is 3 or less.

10. The liquid crystal composition according to claim 9, containing at least one compound selected from the group of compounds represented by a formula (4-1) to formula (4-21) as the third component:

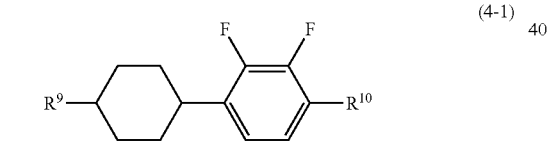
(4-1)

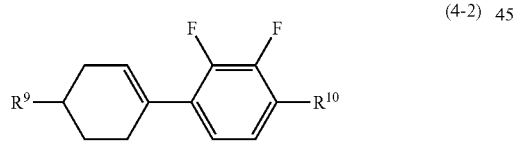
(4-2)

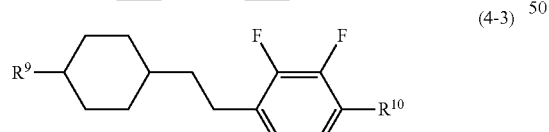
(4-3)

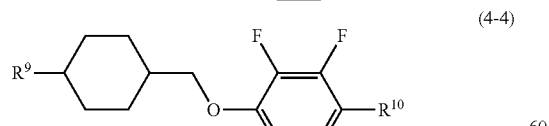
(4-4)

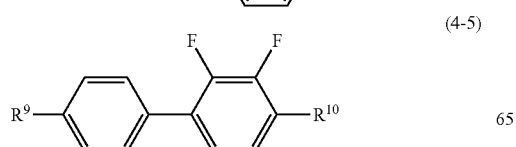
(4-5)

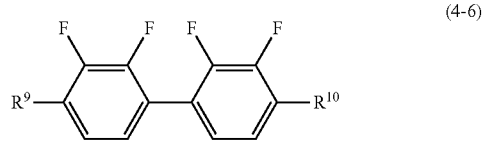
(4-6)

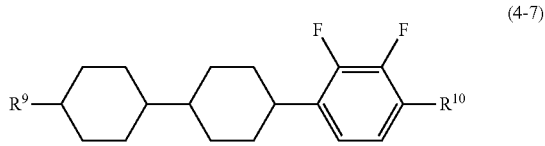
(4-7)

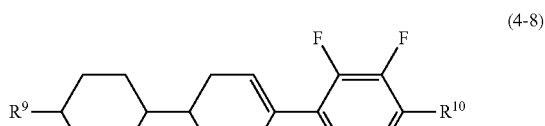
(4-8)

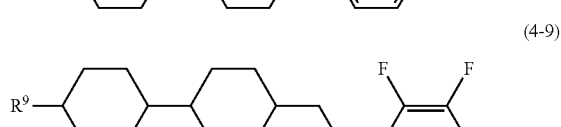
(4-9)

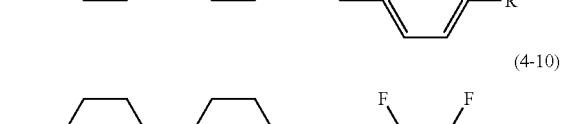
(4-10)

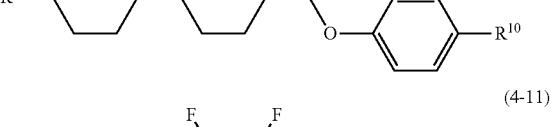
(4-11)

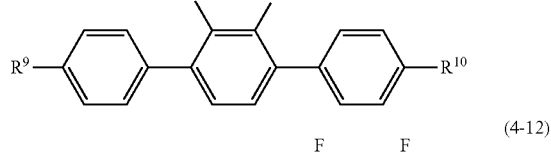
(4-12)

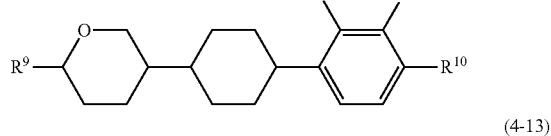
(4-13)

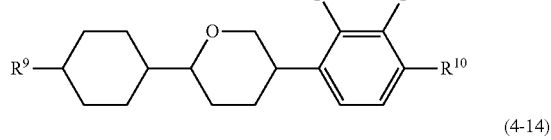
(4-14)

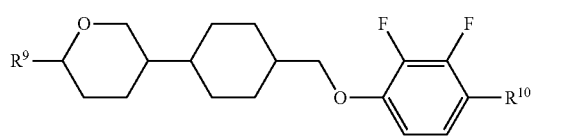
(4-15)

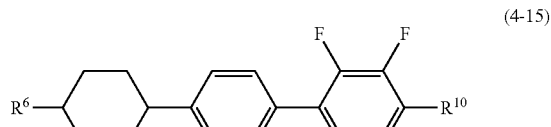
(4-16)

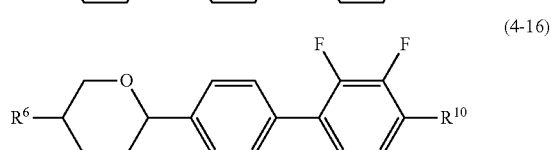

-continued

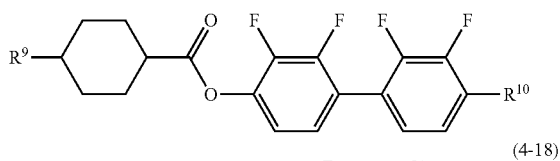
(4-17)

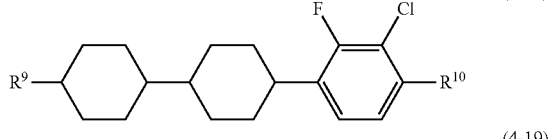
(4-18)

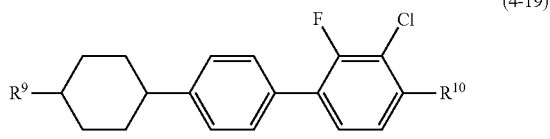
(4-19)

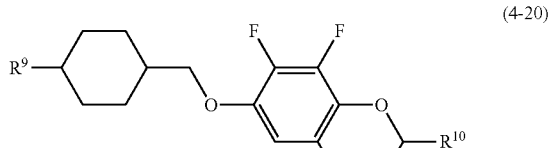
(4-20)

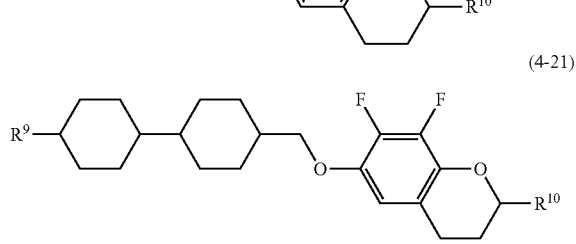
(4-21)

wherein, in formula (4-1) to formula (4-21), $R^9$ and $R^{10}$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one of hydrogen is replaced by fluorine or chlorine.

11. The liquid crystal composition according to claim 9, wherein a ratio of the third component is in the range of 3% by weight to 25% by weight based on the weight of the liquid crystal composition.

12. The liquid crystal composition according to claim 6, containing at least one compound selected from the group of compounds represented by formula (4) as a third component:

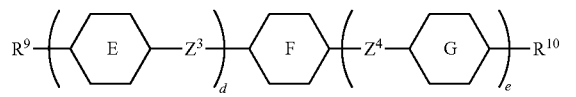
(4)

wherein, in formula (4), $R^9$ and $R^{10}$ are independently alkyl having 1 to 12 carbons, alkoxy having 1 to 12 carbons, alkenyl having 2 to 12 carbons, or alkyl having 1 to 12 carbons in which at least one of hydrogen is replaced by fluorine or chlorine; ring E and ring G are independently 1,4-cyclohexylene, 1,4-cyclohexenylene, 1,4-phenylene, 1,4-phenylene in which at least one of hydrogen is replaced by fluorine or chlorine, or tetrahydropyran-2,5-diyl; ring F is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, ethylene, carbonyloxy or methyleneoxy; d is 1, 2 or 3, and e is 0 or 1; and a sum of d and e is 3 or less.

13. The liquid crystal composition according to claim 12, containing at least one compound selected from the group of compounds represented by a formula (4-1) to formula (4-21) as the third component:

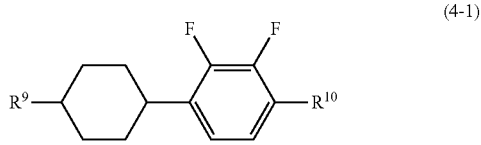
(4-1)

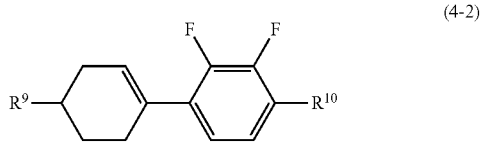
(4-2)

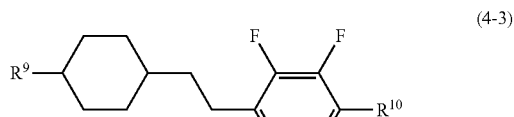
(4-3)

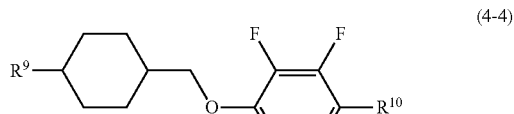
(4-4)

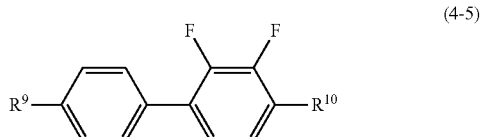
(4-5)

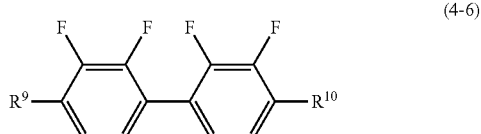
(4-6)

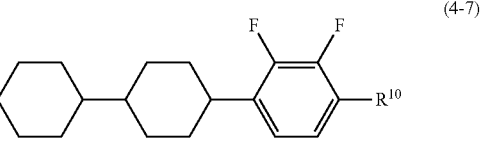
(4-7)

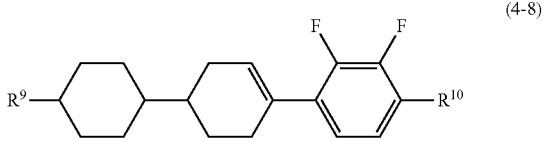
(4-8)

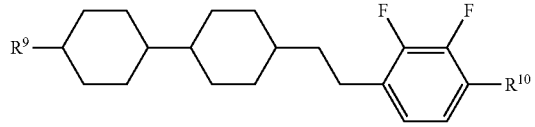
(4-9)

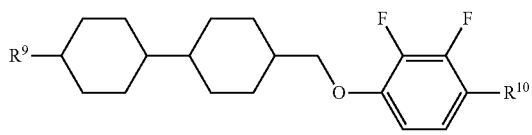
(4-10)

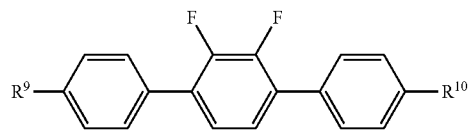
(4-11)

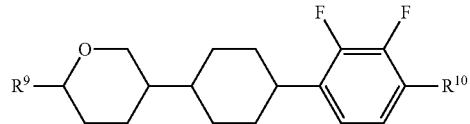
(4-12)

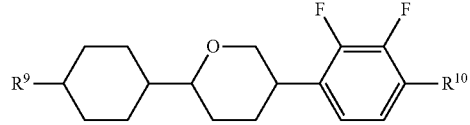
(4-13)

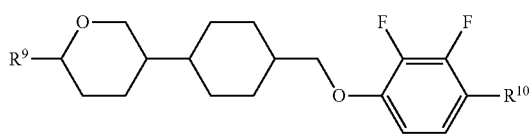
(4-14)

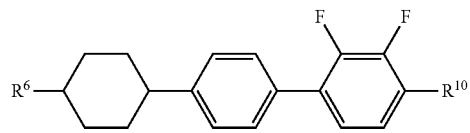
(4-15)

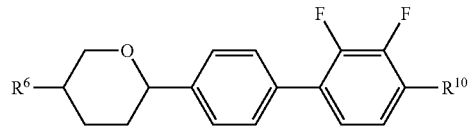
(4-16)

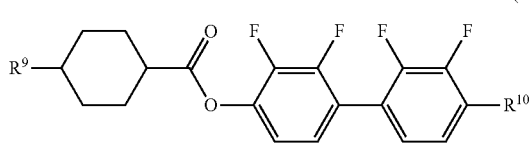
(4-17)

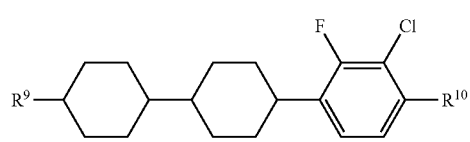
(4-18)

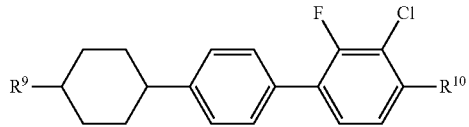
(4-19)

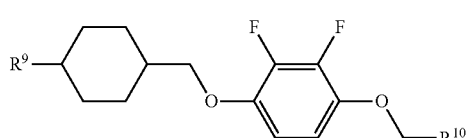
(4-20)

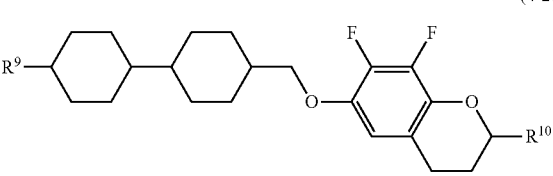
(4-21)

wherein, in formula (4-1) to formula (4-21), $R^9$ and $R^{10}$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one of hydrogen is replaced by fluorine or chlorine.

14. The liquid crystal composition according to claim 12, wherein a ratio of the third component is in the range of 3% by weight to 25% by weight based on the weight of the liquid crystal composition.

15. The liquid crystal composition according to claim 1, wherein a maximum temperature of a nematic phase is 70° C. or higher, optical anisotropy (measured at 25° C.) at a wavelength of 589 nanometers is 0.07 or more, and dielectric anisotropy (measured at 25° C.) at a frequency of 1 kHz is 2 or more.

16. A liquid crystal display device, including the liquid crystal composition according to claim 1.

17. The liquid crystal display device according to claim 16, wherein an operating mode of the liquid crystal display includes a TN mode, an ECB mode, an OCB mode, an IPS mode, an FFS mode or an FPA mode, and a driving mode of the liquid crystal display device includes an active matrix mode.

* * * * *